(12) United States Patent
Kurabuchi

(10) Patent No.: US 12,231,740 B2
(45) Date of Patent: *Feb. 18, 2025

(54) VIDEO DISTRIBUTION SYSTEM FOR LIVE DISTRIBUTING VIDEO CONTAINING ANIMATION OF CHARACTER OBJECT GENERATED BASED ON MOTION OF DISTRIBUTOR USER, DISTRIBUTION METHOD, AND STORAGE MEDIUM STORING VIDEO DISTRIBUTION PROGRAM

(71) Applicant: GREE, Inc., Tokyo (JP)

(72) Inventor: Aya Kurabuchi, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/493,392

(22) Filed: Oct. 24, 2023

(65) Prior Publication Data

US 2024/0056653 A1 Feb. 15, 2024

Related U.S. Application Data

(63) Continuation of application No. 17/694,091, filed on Mar. 14, 2022, now Pat. No. 11,838,603, which is a
(Continued)

(30) Foreign Application Priority Data

Aug. 28, 2018 (JP) .................................. 2018-159802
Feb. 28, 2019 (JP) .................................. 2019-035044
(Continued)

(51) Int. Cl.
*H04N 21/81* (2011.01)
*H04N 21/2187* (2011.01)
(Continued)

(52) U.S. Cl.
CPC ..... *H04N 21/8146* (2013.01); *H04N 21/2187* (2013.01); *H04N 21/42203* (2013.01);
(Continued)

(58) Field of Classification Search
CPC ......... H04N 21/8146; H04N 21/47815; H04N 21/42203; H04N 21/4316; H04N 21/816;
(Continued)

(56) References Cited

U.S. PATENT DOCUMENTS 11,336,969 B2 * 5/2022 Kurabuchi ........... H04N 21/632
11,838,603 B2 * 12/2023 Kurabuchi ......... H04N 21/2187
2016/0286275 A1 9/2016 Maeda et al.

FOREIGN PATENT DOCUMENTS

CN 105765620 A 7/2016
CN 106210855 A 12/2016
(Continued)

OTHER PUBLICATIONS

English translation of WO-2018142494-A1 (Year: 2018).*
(Continued)

*Primary Examiner* — John R Schnurr
(74) *Attorney, Agent, or Firm* — Pillsbury Winthrop Shaw Pittman, LLP

(57) ABSTRACT

One embodiment of the invention relates to a video distribution system for live distributing a video containing animation of a character object generated based on a motion of a second user. The video distribution system includes one or more computer processors that execute computer-readable instructions to: display a display instruction object on a second user device that is used by the second user in response to reception of a first display request for a first gift from a first user; and display the first gift in the video in response to operation on the display instruction object.

16 Claims, 15 Drawing Sheets

Related U.S. Application Data continuation of application No. 17/157,176, filed on Jan. 25, 2021, now Pat. No. 11,336,969, which is a continuation of application No. 16/552,367, filed on Aug. 27, 2019, now Pat. No. 11,044,535.

(30) Foreign Application Priority Data

| Apr. 25, 2019 | (JP) | ................................ | 2019-083729 |
| Jul. 1, 2019 | (JP) | ................................ | 2019-122885 |

(51) Int. Cl.
　　*H04N 21/422*　　(2011.01)
　　*H04N 21/431*　　(2011.01)
　　*H04N 21/478*　　(2011.01)
　　*H04N 21/472*　　(2011.01)

(52) U.S. Cl.
　　CPC ... *H04N 21/4316* (2013.01); *H04N 21/47815* (2013.01); *H04N 21/816* (2013.01); *H04N 21/472* (2013.01)

(58) Field of Classification Search
　　CPC .............. H04N 21/2187; H04N 21/472; H04N 21/632; H04N 21/458; H04N 21/439
　　See application file for complete search history.

(56) References Cited

FOREIGN PATENT DOCUMENTS

| CN | 106412614 A | 2/2017 | |
| JP | 2012-120098 A | 6/2012 | |
| WO | WO-2018142494 A1 * | 8/2018 | ......... H04N 21/2187 |

OTHER PUBLICATIONS

First Office Action dated Jan. 26, 2024, issued in corresponding Chinese Patent Application No. 202210597462.0 with English translation (26 pgs.).

Decision to Refuse European Patent Application dated Feb. 9, 2024, issued in corresponding European Patent Application No. 19173227.0 (17 pgs.).

Minutes of the Hearing before Examining Division dated Feb. 8, 2024, issued in corresponding European Patent Application No. 19173227.0 (4 pgs.).

Non-Final Office Action dated Jan. 31, 2024, issued in corresponding U.S. Appl. No. 17/395,241 (29 pgs.).

Notice of Reasons for Refusal dated Dec. 19, 2023, issued in corresponding Japanese Patent Application No. 2022-206665 with English translation (7 pgs.).

First Office Action dated Dec. 15, 2023, issued in corresponding Chinese Patent Application No. 202210597360.9 with English translation (20 pgs.).

* cited by examiner

VIDEO DISTRIBUTION SYSTEM FOR LIVE DISTRIBUTING VIDEO CONTAINING ANIMATION OF CHARACTER OBJECT GENERATED BASED ON MOTION OF DISTRIBUTOR USER, DISTRIBUTION METHOD, AND STORAGE MEDIUM STORING VIDEO DISTRIBUTION PROGRAM

CROSS-REFERENCE TO RELATED APPLICATIONS

This application is a Continuation application of U.S. Ser. No. 17/694,091 filed on Mar. 14, 2022, which is a Continuation application of U.S. Ser. No. 17/157,176 filed on Jan. 25, 2021 now U.S. Pat. No. 11,336,969, which is a Continuation application of U.S. Ser. No. 16/552,367 filed on Aug. 27, 2019 now U.S. Pat. No. 11,044,535 and claims the benefit of priority from Japanese Patent Application Serial Nos. 2018-159802 (filed on Aug. 28, 2018), 2019-035044 (filed on Feb. 28, 2019), 2019-083729 (filed on Apr. 25, 2019), and 2019-122885 (filed on Jul. 1, 2019), the contents of which are hereby incorporated by reference in its entirety.

TECHNICAL FIELD

The present disclosure relates to a video distribution system, a video distribution method, and a storage medium storing a video distribution program, for live distributing a video containing animation of a character object generated based on motions of a distributor user.

BACKGROUND

Video distribution systems that generate an animation of a character object based on motions of a distributor user and live distribute a video including the animation of the character object have been known. Such a video distribution system is disclosed, for example, in Japanese Patent Application Publication 2015-184689 ("the '689 Publication") and "Hasegawa Yusuke, Beginning of New Ear of Virtual Idle PROJECT Mari A, CG WORLD, Japan, Bone Digital Co., Ltd., Nov. 10, 2017, 231, pp. 74-79."

Also known are content distribution systems that receive a request from a viewing user who is viewing contents, and in response to the request, display on a display screen a gift object corresponding to a gift that is purchased by the viewing user. For example, in the video distribution system disclosed in Japanese Patent Application Publication No. 2012-120098 ("the '098 Publication"), a viewing user can purchase a gift item and provide the purchased gift item to a distributor user as a gift. The gift is displayed in a video in response to a display request from the viewing user. A display request to display a gift may also automatically generated in response to purchase of the gift by a viewing user.

In the above-mentioned prior art, a gift is automatically displayed in a live-distributed video in response to reception of a display request for the gift from a viewing user. Therefore, the gift may be displayed in the video at a timing not preferred by a distributor user. Thus, there is a problem that the distributor user may feel his/her performance through a character object interrupted. For example, if the gift is displayed prominently in video while the distributor user is performing, it is difficult to fully express the performance in the video.

Moreover, if the gift is displayed in the video at a timing not preferred by the distributor user, it may lead to deterioration of the viewing experience of viewing users. For example, if a main part of the video is hidden behind the gift, the viewer may feel his/her viewing of the video is impeded. In particular, when too many gifts are displayed such that they are superimposed on the video, this drawback may be more severe.

Therefore, in the '098 Publication, gift objects are not displayed in a content display region that displays the video, but displayed in the background region outside the content display region. As described above, in the conventional video distribution systems, since gifts may be displayed in the video at a timing not preferred by the distributor user, it may be difficult to arrange a gift display region in the main part of the video (for example, around the character object).

SUMMARY

It is an object of the present disclosure to provide a technical improvement which solves or alleviates at least part of the drawbacks of the prior art mentioned above. In particular, one object of the present invention is to provide a video distribution system, a video distribution method, and a storage medium storing a video distribution program, capable of displaying a gift in a live-distributed video at a desired timing for a distributor user.

One aspect of the invention relates to a video distribution system for live distributing a video containing animation of a character object generated based on a motion of a distributor user. The video distribution system includes one or more computer processors that execute computer-readable instructions to: display a display instruction object on a distributor user device that is used by the distributor user in response to reception of a first display request for a first gift from a viewing user; and display the first gift in the video in response to operation on the display instruction object.

In the video distribution system, the first gift may be a wear gift associated with a worn-on portion of the character object, the wear gift may be displayed in the video at a position corresponding to the worn-on portion in response to the operation on the display instruction object.

In the video distribution system, the wear gift includes a first wear gift that is associated with a first worn-on portion among a plurality of the worn-on portions of the character object. A first display time in which the first wear gift is displayed in the video is set for the first wear gift, and when the first wear gift is displayed in the video, the one or more computer processors may prohibit display of a second wear gift that is associated with the first worn-on portion among the plurality of the wear gifts until the first display time elapses.

In the video distribution system, when the first wear gift is displayed in the video, one or more computer processors may deactivate the display instruction object that is for displaying a second wear gift associated with the first worn-on portion among the plurality of the wear gifts until the first display time elapses.

In the video distribution system, the one or more computer processors may further execute computer-readable instructions to: display a message on the distributor user device in response to reception of a message gift associated with the message from the viewing user, and display the message gift in the video in response to a display instruction operation on the distributor user device.

In the video distribution system, voice of the distributor user may be included in the video, a voice change instruction object may be displayed on the distributor user device in response to reception of a voice change gift that is for changing the voice of the distributor user from the viewing user, and the voice of the distributor user may be changed to a voice designated by the voice change gift in response to the operation on the voice change instruction object.

In the video distribution system, the one or more computer processors may further execute computer-readable instructions to display a second gift in the video in response to reception of a second display request for the second gift that is displayed in the video without being associated with a specific portion of the character object from a viewing user who views the video.

In the video distribution system, a gift display prohibition period may be set in a distribution period of the video, and the second gift may be displayed in the video at a timing other than the object display prohibition period in the distribution period of the video.

In another aspect of the invention, provided is a video distribution method performed by one or more computer processors executing computer-readable instructions to live distribute a video containing animation of a character object generated based on a motion of a distributor user. the video distribution method includes displaying a display instruction object on a distributor user device that is used by the distributor user in response to reception of a first display request for a first gift from a viewing user, and displaying the first gift in the video in response to operation on the display instruction object.

In yet another aspect of the invention, provided is a non-transitory computer-readable storage medium storing a video distribution program for live distributing a video containing animation of a character object generated based on a motion of a distributor user. The video distribution program causes one or more computer processors to: display a display instruction object on a distributor user device that is used by the distributor user in response to reception of a first display request for a first gift from a viewing user; and display the first gift in the video in response to operation on the display instruction object.

According to the aspects of the invention, it is possible to display a gift in the live-distributed video at a desired timing of the distributor user.

DESCRIPTION OF THE PREFERRED EMBODIMENTS

Figure 1:
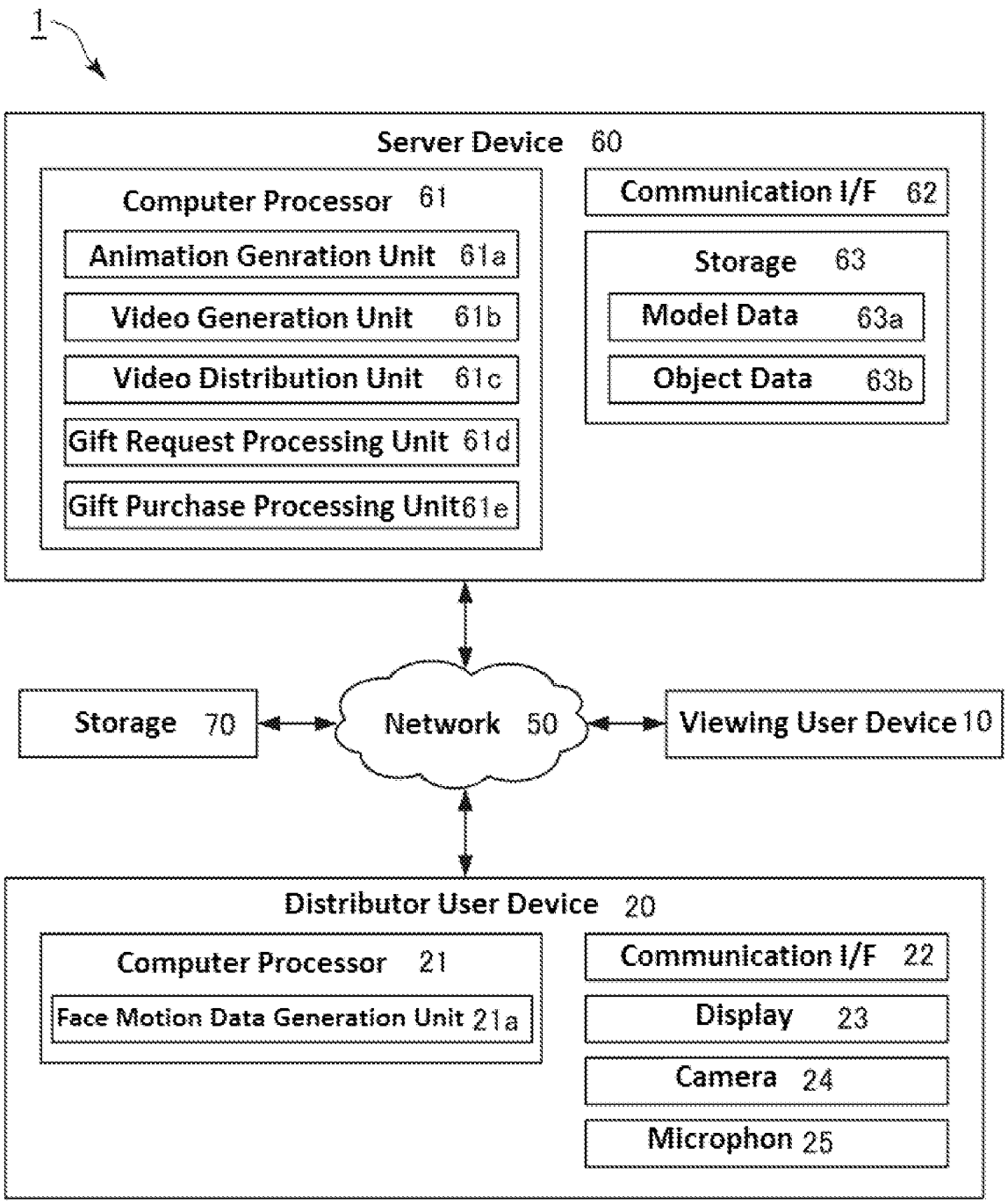
FIG. 1 is a block diagram illustrating a video distribution system in one embodiment.

Various embodiments of the disclosure will be described hereinafter with reference to the accompanying drawings. Throughout the drawings, the same or similar elements are denoted by the same reference numerals.

Figure 2:
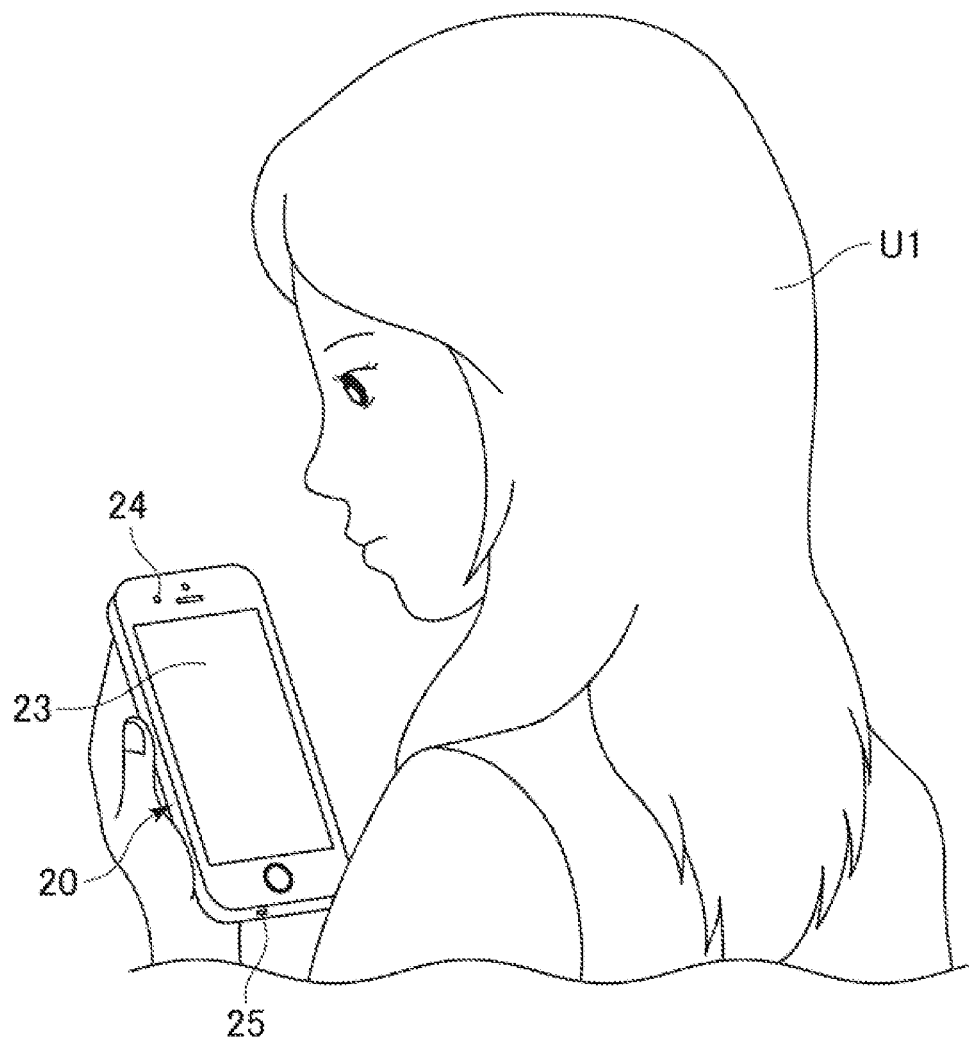
FIG. 2 schematically illustrates a distributor user who distributes a video in the video distribution system of FIG. 1 and a distributor user device that the distributor user uses.

With reference to FIGS. 1 to 2, a video distribution system in one embodiment will be described. FIG. 1 is a block diagram illustrating a video distribution system 1 in one embodiment, and FIG. 2 schematically illustrates a distributor user U1 who distributes a video in the video distribution system of FIG. 1 and a distributor user device 20 that the distributor user uses.

The video distribution system 1 includes a viewing user device 10, the distributor user device 20, a server device 60, and a storage 70. The viewing user device 10, the distributor user device 20, the server device 60, and the storage 70 are communicably interconnected over a network 50. The server device 60 is configured to distribute a video including an animation of a character of the distributor user U1, as described later.

The video is distributed from the server device 60 to the viewing user device 10 and the distributor user device 20. The distributed video is displayed on a display of the viewing user device 10. A viewing user who is a user of the viewing user device 10 is able to view the distributed video on the viewing user device. Although only the single viewing user device 10 is shown in FIG. 1 to simplify the drawing, the video distribution system 1 may include two or more viewing user devices. The distributor user U1 is able to perform while checking a moving image in the video by viewing the distributed video.

First, a description is given of the distributor user device 20. In the illustrated embodiment, the distributor user device 20 includes a computer processor 21, a communication I/F 22, a display 23, a camera 24, and a microphone 25.

The computer processor 21 is a computing device which loads various programs realizing an operating system and various functions from the storage into a memory unit and executes instructions included in the loaded programs. The computer processor 21 is, for example, a CPU, an MPU, a DSP, a GPU, any other computing device, or a combination thereof. The computer processor 21 may be realized by means of an integrated circuit such as ASIC, PLD, FPGA, MCU, or the like. Although the computer processor 21 is illustrated as a single component in FIG. 1, the computer processor 21 may be a collection of a plurality of physically separate computer processors.

The communication I/F 22 may be implemented as hardware, firmware, or communication software such as a TCP/IP driver or a PPP driver, or a combination thereof. The distributor user device 20 is able to transmit and receive data to and from other devices via the communication I/F 22.

The display 23 includes a display panel and a touch-screen panel. The touch-screen panel is configured to detect touch interactions (touch operations) performed by a user. The touch-screen panel is capable of detecting various touch operations such as tapping, double tapping, and dragging performed by the user. The touch-screen panel may include a capacitive proximity sensor and may be capable of detecting a non-contact operation performed by the user.

The camera 24 continuously captures images of the face of the distributor user U1 to obtain imaging data of the face of the distributor user U1. The imaging data of the face of the distributor user U1 captured by the camera 24 is transmitted to the server device 60 via the communication I/F 22. The camera 24 may be 3D cameras capable of detecting the depth of a face of a person.

The microphone 25 is a sound collector configured to convert an input voice into voice data. The microphone 25 is capable of obtaining a voice input from the distributor user U1. The voice input of the distributor user U1 acquired by the microphone 25 is converted into voice data, and the voice data is transmitted to the server device 60 via the communication I/F 22.

The viewing user device 10 may include the same components as the distributor user device 20. For example, the viewing user device 10 may include a computer processor, a communication I/F, a display, and a camera.

The viewing user device 10 and the distributor user device 20 are information processing devices such as smartphones. In addition to the smartphones, the viewing user device 10 and the distributor user device 20 may be mobile phones, tablets, personal computers, electronic book readers, wearable computers, game consoles, or any other information processing devices that are capable of reproducing a video. The viewing user device 10 and the distributor user device 20 may each include a sensor unit including various sensors such as a gyro sensor and a storage for storing various information in addition to the above-mentioned components.

Next, a description is given of the server device 60. In the illustrated embodiment, the server device 60 includes a computer processor 61, a communication I/F 62, and a storage 63.

The computer processor 61 is a computing device which loads various programs realizing an operating system and various functions from the storage 63 or other storage into a memory unit and executes instructions included in the loaded programs. The computer processor 61 is, for example, a CPU, an MPU, a DSP, a GPU, any other computing device, or a combination thereof. The computer processor 61 may be realized by means of an integrated circuit such as ASIC, PLD, FPGA, MCU, or the like. Although the computer processor 61 is illustrated as a single component in FIG. 1, the computer processor 61 may be a collection of a plurality of physically separate computer processors.

The communication I/F 62 may be implemented as hardware, firmware, or communication software such as a TCP/IP driver or a PPP driver, or a combination thereof. The server device 60 is able to transmit and receive data to and from other devices via the communication I/F 62.

The storage 63 is a storage device accessed by the computer processor 61. The storage 63 is, for example, a magnetic disk, an optical disk, a semiconductor memory, or various other storage device capable of storing data. Various programs may be stored in the storage 63. At least some of the programs and various data that may be stored in the storage 63 may be stored in a storage (for example, a storage 70) that is physically separated from the server device 60.

In this specification, a program or instructions included in the program that are described as being executed by the computer processor 21 or the computer processor 61 may be executed by a single computer processor or executed by a plurality of computer processors distributively. Further, a program or instructions included in the program executed by the computer processor 21 or the computer processor 61 may be executed by a plurality of virtual computer processors.

Next, data stored in the storage 63 will be described. In the illustrated embodiment, the storage 63 stores model data 63*a*, object data 63*b*, and any other data required for generation and distribution of a video to be distributed.

The model data 63*a* is model data for generating animation of a character. The model data 63*a* may be three-dimensional model data for generating three-dimensional animation, or may be two-dimensional model data for generating two-dimensional animation. The model data 23*a* includes, for example, rig data (also referred to as "skeleton data") indicating a skeleton of a face and a skeleton of body parts other than the face of a character, and surface data indicating the shape or texture of surfaces of the character. The model data 63*a* may include two or more different pieces of model data. The pieces of model data may each have different rig data, or may have the same rig data. The pieces of model data may have different surface data or may have the same surface data.

The object data 63*b* includes asset data used for constructing a virtual space in the video. The object data 63*b* includes data for rendering a background of the virtual space in the video, data for rendering various objects displayed in the video, and data for rendering any other objects displayed in the video. The object data 63*b* may include object position information indicating the position of an object in the virtual space.

In addition to the above, the object data 63*b* may include a gift object. The gift object is displayed in a video in response to a display request from a viewing user who watches the video. The gift object may include an effect object corresponding to an effect gift, a normal object corresponding to a normal gift, a wear object corresponding to a wear gift, and a message object corresponding to a message gift. Viewing users are able to purchase a desired gift(s).

The effect object representing the effect gift is an object that affects the impression of the entire viewing screen of the distributed video, and is, for example, an object representing confetti. The object representing confetti may be displayed on the entire viewing screen, which can change the impression of the entire viewing screen. The effect object may be displayed so as to overlap with the character object, but it is different from the wear object in that it is displayed without any association with a specific portion of the character object.

The normal object is an object representing a gift from a viewing user to a distributor user (for example, the distributor user U1), for example, an object simulating a stuffed toy, a bouquet, an accessory, or any other gift or something suitable as a present. In one embodiment, the normal object is displayed on the display screen of the video such that it does not contact the character object. In one embodiment, the normal object is displayed on the display screen of the video such that it does not overlap with the character object. The normal object may be displayed in the virtual space such that it overlaps with an object other than the character object. The normal object may be displayed so as to overlap with the character object, but it is different from the wear object in that it is not displayed in association with a specific portion of the character object. In one embodiment, when the normal object is displayed such that it overlaps with the character object, the normal object may hide portions of the character object other than the head including the face of the character object but does not hide the head of the character object. In one embodiment, when the normal object is displayed such that it overlaps with the character object, the normal object may hide portion(s) of the character object other than its upper body but does not hide the upper body of the character object including the face of the character object.

The wear object is an object displayed on the display screen in association with a specific portion (worn-on portion) of the body of the character object. In one embodiment, the wear object displayed on the display screen in association with a specific portion of the character object is displayed adjacent to the specific portion of the character object on the display screen. In one embodiment, the wear object displayed on the display screen in association with a specific portion of the character object is displayed such that it partially or entirely covers the specific portion of the character object on the display screen. The specific part may be specified by three-dimensional position information that indicates a position in a three-dimensional coordinate space, or the specific portion may be associated with position information in the three-dimensional coordinate space. For example, a specific portion in the head of a character may be specified in the units of the front left side, the front right side, the rear left side, the rear right side, the middle front side, and the middle rear side of the head, the left eye, the right eye, the left ear, the right ear, and the whole hair.

The wear object is an object that can be attached to a character object, for example, an accessory (such as a headband, a necklace, an earring, etc.), clothes (such as a T-shirt), a costume, and any other object which can be worn by the character object. The object data 63b corresponding to the wear object may include worn-on portion information indicating which body portion of the character object the wear object is associated with. The worn-on portion information of a wear object may indicate on which body part of the character object the wear object is worn. For example, when the wear object is a headband, the worn-on portion information of the wear object may indicate that the wear object is worn on the "head" of the character object. When the worn-on portion of a wear object is specified as a position in a three-dimensional coordinate space, the worn-on portion information may be associated with two or more positions in the three-dimensional coordinate space. For example, the worn-on portion information that indicates the position to which a wear object representing "a headband" is worn may be associated with two portions: "the rear left side of the head" and "the rear right side of the head" of the character object. In other words, the wear object representing the "headband" may be worn on both "the rear left side of the head" and "the rear right side of the head." When the wear object is a T-shirt, the worn-on portion information of the wear object may indicate that the wear object is worn on the "torso" of the character object.

Two different wear objects having a common worn-on portion are displayed at different time in the video. That is, the two different wear objects having the common worn-on portion are worn by the character object at different timing. In other words, the two different objects having the common worn-on portion are not simultaneously worn by the character object. For example, when the "head" is set as the worn-on body portion for a wear object representing a headband and a wear object representing a hat, the wear object representing the headband and the wear object representing the hat are not simultaneously displayed.

The message object representing a message gift includes a message from a viewing user. The message object may be displayed on a video in a manner more prominent than a comment displayed in a comment display area 35 described later. The message object may be displayed on a video for a longer time than a comment displayed in the comment display area 35.

A duration of time of displaying a gift object may be set depending on its type. In one embodiment, the duration of displaying or display time of the wear object may be set longer than the display time of the effect object and the display time of the normal object. For example, the duration of displaying the wear object may be set to 60 seconds, while the duration of displaying the effect object may be set to five seconds, and the duration of displaying the normal object may be set to ten seconds.

Functions realized by the computer processor 21 will be now described more specifically. The computer processor 21 functions as a face motion data generation unit 21a by executing computer-readable instructions included in a distribution program. At least some of the functions that can be realized by the computer processor 21 may be realized by a computer processor other than the computer processor 21 of the video distribution system 1. For example, at least some of the functions realized by the computer processor 21 may be realized by the computer processor 61 mounted on the server device 60.

The face motion data generation unit 21a generates face motion data, which is a digital representation of motions of the face of the distributor user U1, based on captured image data of the camera 24. The face motion data is serially generated with time as needed. The face motion data may be generated at predetermined sampling time intervals. Thus, the face motion data can digitally represent facial motions (changes in facial expression) of the distributor user U1 in time series. The face motion data generated by the face motion data generation unit 21a is transmitted to the server device 60 via the communication I/F 22.

In addition to the face motion data generated by the face motion data generation unit 21a, the distributor user device 20 may generate body motion data that is a digital representation of the position and orientation of each body part other than the face of the distributor user U1. The distributor user device 20 may transmit the body motion data to the server device 60 in addition to the face motion data. In order to generate the body motion data, the distributor user U1 may wear a motion sensor. The distributor user device 20 may be capable of generating the body motion data based on detection result information of the motion sensor attached to the distributor user U1. The body motion data may be generated at predetermined sampling time intervals. Thus, the body motion data can represent body motions of the distributor user U1 in time series as digital data. Generation of the body motion data based on the detection result information of the motion sensor attached to the distributor user U1 may be performed, for example, in a shooting studio. The shooting studio may be provided with a base station, a tracking sensor, and a display. The base station may be a multi-axis laser emitter. The motion sensor attached to the distributor user U1 may be, for example, Vive Trackers provided by HTC CORPORATION. The base station installed in the shooting studio may be, for example, a base station provided by HTC CORPORATION. In addition, a supporter computer may be provided in a separate room from the shooting studio. The display in the shooting studio may be configured to display information received from the support computer. The server device 60 may be installed in the same room as the room in which the supporter computer is installed. The room where the support computer is installed and the shooting studio may be separated by a glass window. In this case, an operator of the supporter computer (may also referred to as a "supporter" in the specification) can see the distributor user U1. The supporter computer may be capable of changing the setting(s) of the devices installed in the shooting studio according to the operation by the supporter. The supporter computer can change, for example, the setting of a scanning interval performed by the base station, the setting of of the tracking sensor, and various settings of other devices. The supporter is able to input a message to the supporter computer, and the inputted message is displayed on the display in the shooting studio.

Functions realized by the computer processor 61 will be now described more specifically. The computer processor 61 functions as an animation generation unit 61*a*, a video generation unit 61*b*, a video distribution unit 61*c*, a gift request processing unit 61*d*, and a gift purchase processing unit 61*e* by executing computer-readable instructions included in the distribution program. At least some of the functions that can be realized by the computer processor 61 may be realized by a computer processor other than the computer processor 61 of the video distribution system 1. At least one of the functions that are realized by the computer processor 21 may be realized by the computer processor 21 in the distributor user device 20 or a computer processor of the viewing user device 10. More specifically, some or all of the functions of the animation generation unit 61*a* and the video generation unit 61*b* may be executed by the distributor user device 20. For example, a video generated by the distributor user device 20 is transmitted to the server device 60 and may be distributed from the server device 60 to the viewing user device 10.

The animation generation unit 61*a* is configured to apply a face motion data generated by the face motion data generation unit 21*a* in the distributor user device 20 to predetermined model data included in the model data 63*a* in order to generate an animation of a character object. The animation generation unit 61*a* is capable of generating an animation of a character object such that the expression of the character object changes based on the face motion data. More specifically, the animation generation unit 61*a* is capable of generating an animation of a character object whose face moves in synchronization with the facial expression of the distributor user U1 based on the face motion data about the distributor user U1.

When the distributor user device 20 provides body motion data of the distributor user U1, the animation generation unit 61*a* is capable of generating an animation of a character object whose body and face move in synchronization with the body motion and the facial expression of the distributor user U1 based on the body motion data and the face motion data about the distributor user U1.

The video generation unit 61*b* is capable of generating a background image representing a background using the object data 63*b*, and can generate a video including the background image and an animation of a character object corresponding to the distributor user U1. In the video generated by the video generation unit 61*b*, the character object corresponding to the distributor user U1 is displayed such that it is superimposed on the background image.

The video generation unit 61*b* is capable of adding a voice of the distributor user U1 produced based on the voice data received from the distributor user device 20 to the generated video. As described above, the video generation unit 61*b* generates the animation of the character object moving in synchronization with the facial expression of the distributor user U1, and generates the video in which the voice of the distributor user U1 is added to the animation for distribution.

The video distribution unit 61*c* distributes the video generated by the video generation unit 61*b*. The video is distributed to the viewing user device 10 and other viewing user devices over the network 50. The generated video is also distributed to the distributor user device 20. The distributed video is reproduced in the viewing user device 10 and the distributor user device 20. In one embodiment, a video distributed to the viewing user device 10 and the distributor user device 20 is rendered by the server device 60. In another embodiment, rendering of the video may be performed respectively by the viewing user device 10 and the distributor user device 20. In this case, the server device 60 may transmit either the face motion data or the body motion data or both of them received from the distributor user to the viewing user device 10 and the distribution user device 20. When the video includes the gift object, the server device 60 may transmit data necessary for rendering the video including the gift object to the viewing user device 10 and the distributor user device 20 in addition to the face motion data and the body motion data. When the video includes voice, the server device 60 may transmit voice data specifying the voice to the viewing user device 10 and the distributor user device 20. The viewing user device 10 and the distributor user device 20 generate an animation of a character object that moves in synchronization with body movements and facial expression of the distributor user U1 based on at least one of the face motion data and the body motion data received from the server device 60. In order to create an animation of a character object, the model data 63*a* may be stored in the viewing user device 10 and the distributor user device 20. The viewing user device 10 and the distributor user device 20 may store the object data 63*b*. In this way, the viewing user device 10 and the distributor user device 20 are capable of rendering the video including the character object based on the face motion data, data relating to gift objects, the voice data, and other data necessary for rendering received from the server device 60. The viewing user device 10 and the distributor user device 20 may render the video further based on the model data 63*a* and the object data 63*b*. The server device 60 is capable of transmitting data necessary for the viewing user device 10 and the distributor user device 20 to render the video to the viewing user device 10 and the distributor user device 20. The viewing user device 10 and the distributor user device 20 are able to display the video that they rendered in the above-described way on their respective displays. As described above, in the video distribution system 1, a video rendered by the server device 60 may be distributed to the viewing user device 10 and the distributor user device 20, or data necessary for rendering the video such as the face motion data and the like may be transmitted from the server device 60 to the viewing user device 10 and the distributor user device 20. That is, distribution of a video from the server device 60 includes (1) distribution of the video rendered by the server device 60 from the server device 60 to the viewing user device 10 and the distributor user device 20, and (2) transmission of data necessary for rendering the video in the viewing user device 10 and the distributor user device 20 from the server device 60 to the viewing user device 10 and the distributor user device 20. In the latter case (2), rendering of the video is performed respectively in the viewing user device 10 and the distributor user device 20, but data necessary for rendering the video (for example, the face motion data) is transmitted from the server device 60 to the viewing user device 10 and the distributor user device 20 so that the process of transmitting the data necessary for rendering the video by the server device is considered as the distribution of the video. In one embodiment of the invention, the distributor user device 20 may acquire at least one of the face motion data and the body motion data, and may perform rendering using the acquired face motion data and/or body motion data to generate the video. The distributor user device 20 is capable of transmitting the video generated in this way to the server device 60. The server device 60 is able to distribute the video received from the distributor user device 20 to the viewing user device 10.

Figure 3A:
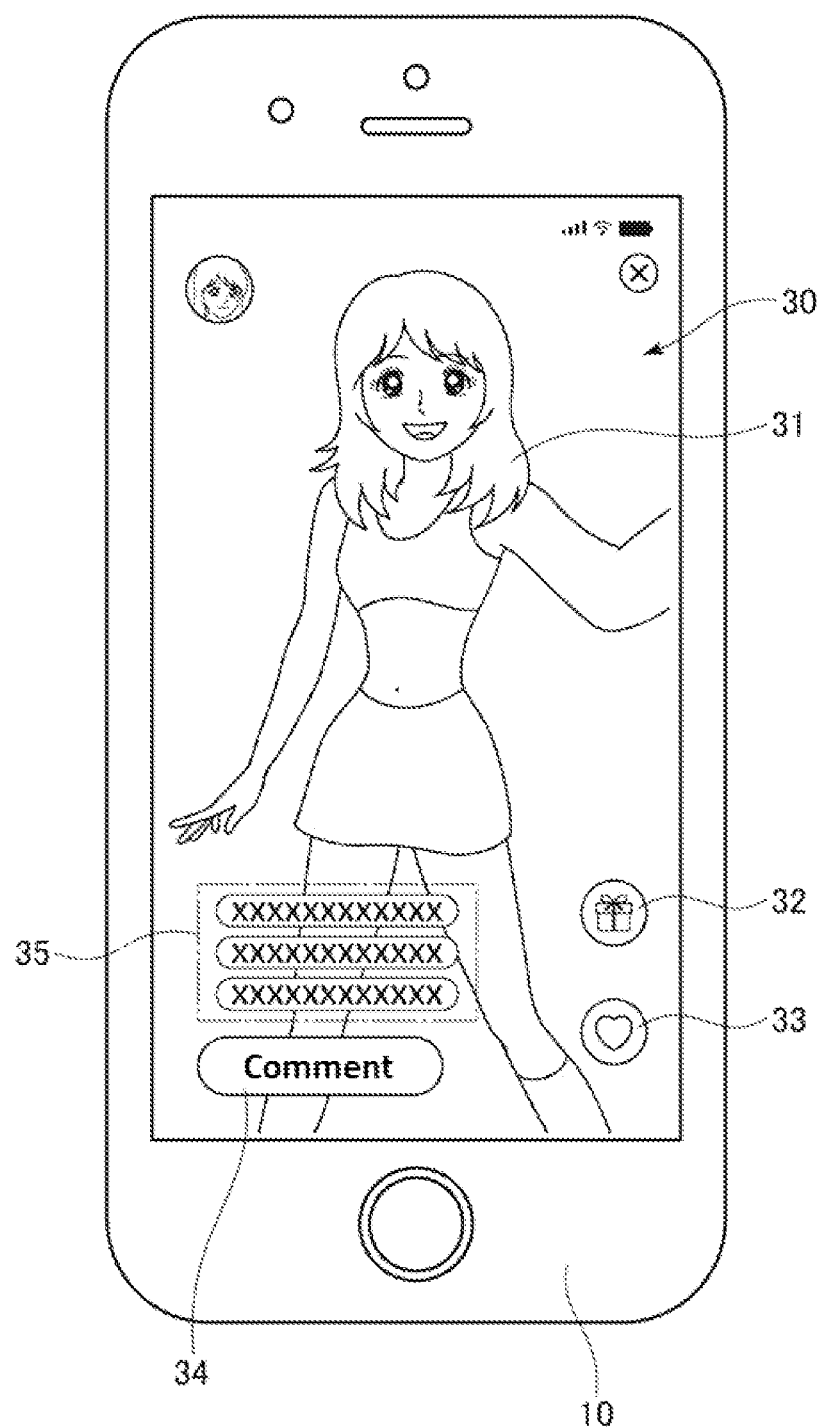
FIG. 3a illustrates an example of a display screen displayed on a viewing user device 10 in one embodiment.
Figure 3B:
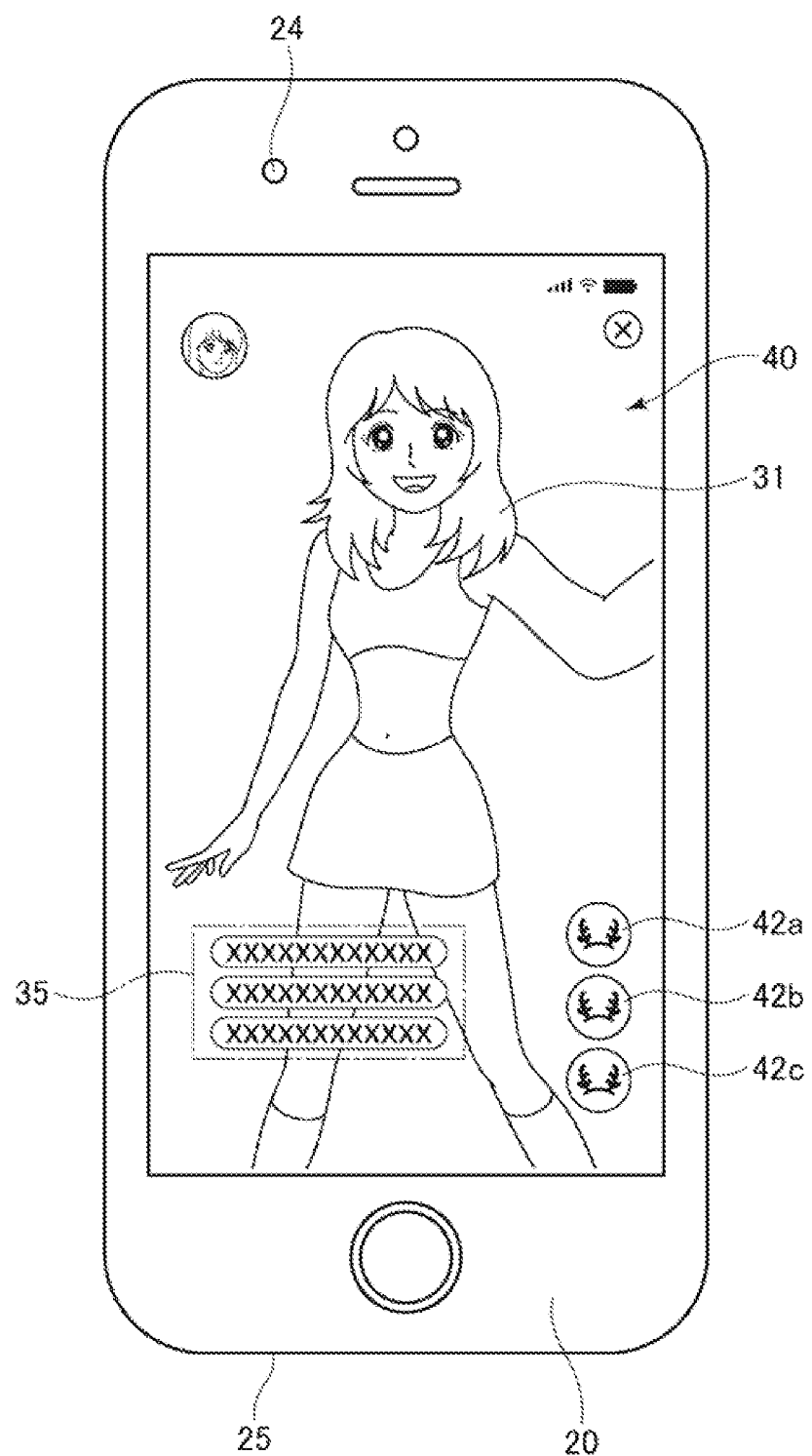
FIG. 3b illustrates an example of a display screen displayed on a distributor user device 20 in one embodiment.

FIG. 3a shows a screenshot example of a video distributed from the video distribution unit 61c and reproduced in the viewing user device 10, and FIG. 3b shows a screenshot example of a video distributed from the video distribution unit 61c and reproduced in the distributor user device 20. As shown in FIG. 3a, a display image 30 of the video distributed from the server device 20 is displayed on the display of the viewing user device 10. The display image 30 displayed on the viewing user device 10 includes a character object 31 corresponding to the distributor user U1 generated by the animation generation unit 61a, a gift button 32, an evaluation button 33, a comment button 34, and a comment display area 35.

Since the character object 31 is generated by applying the face motion data of the distributor user U1 to the model data included in the model data 63a as described above, the character object 31 changes its facial expression in synchronization with the change in the facial expression of the distributor user U1. When the body motion data is provided from the distributor user device 20, the character object 31 may be controlled such that its body parts other than the face also move in synchronization with the body movement of the distributor user U1.

The gift button 32 is displayed on the display screen 30 such that it is selectable by an operation on the viewing user device 10. The gift button 32 may be selected, for example, by tapping a region of a touch-screen panel of the viewing user device 10 where the gift button 32 is displayed. In one embodiment, when the gift button 32 is selected, the display screen 30 displays a window for selecting a gift to be gifted to the distributor user distributing the video which the viewing user is watching. The viewing user is able to purchase a gift to be gifted to the distributor user from among the gifts displayed in the window. In another embodiment, in response to selection of the gift button 32, the display screen 30 displays a window including a list of purchased gifts. In this case, the viewing user is able to select a gift to be gifted to the distributor user from among the listed gifts displayed in the window. Giftable or purchasable gifts may include effect gifts, regular gifts, wear gifts, message gifts, and any other gifts.

The evaluation button 33 is displayed on the display screen 30 such that it is selectable by a viewing user using the viewing user device 10. The evaluation button 33 may be selected, for example, by tapping a region of the touch-screen panel of the viewing user device 10 where the evaluation button 33 is displayed. When the evaluation button 33 is selected by a viewing user who is watching the video, evaluation information indicating that a positive evaluation has been made on the video may be transmitted to the server device 60. The server device 60 may tally evaluation information from the viewing user device 10 and other viewing user devices.

The comment button 34 is displayed on the display screen 30 such that it is selectable by the viewing user. When the comment button 34 is selected by, for example, tapping, a comment input window for writing a comment is displayed on the display screen 30. The viewing user is able to write a comment via an input mechanism of the viewing user device 10. The comment inputted is transmitted to the server device 60 from the viewing user device 10. The server device 60 receives comments from the viewing user device 10 and other viewing user devices, and displays the comments in the comment display area 35 within the display image 30. In the comment display area 35, comments posted from the viewing user device 10 and other viewing user devices are displayed, for example, in a timeline manner. The comment display area 35 occupies a part of the display screen 30. The number of comments that can be displayed in the comment display area 35 is limited. In the illustrated example, up to three comments can be displayed in the comment display area 35. When the number of comments exceeding the upper limit are posted in the comment display area 35, comments are deleted from the comment display area 35 in order from the oldest one. Therefore, the higher the frequency of comments posted from the viewing users is, the shorter the display time of each comment in the comment display area 35 becomes.

As shown in FIG. 3b, a display image 40 of the video distributed from the server device 20 is displayed on the display of the distributor user device 20. The display image 40 displayed on the distributor user device 20 includes the character object 31 corresponding to the distributor user U1, display instruction buttons 42a to 42c for displaying wear gifts for which viewing users made display requests. and the comment display area 35. The display image 40 displayed on the distributor user device 20 includes the same background image, character object image, and comment(s) as the display image 30 displayed on the viewing user device 10. On the other hand, the display image 40 is different from the display image 30 in that the display image 40 does not include the gift button 32, the evaluation button 33, and the comment button 34, but includes the display instruction buttons 42a to 42c.

The display instruction buttons 42a to 42c are displayed on the display screen 40 in response to reception of a display request to display a wear gift from a viewing user, which will be described later. In the illustrated embodiment, the three display instruction buttons 42a to 42c are displayed in the display image 40. Each of the display instruction buttons 42a to 42c is displayed on the display screen 40 such that they are selectable by the distributor user. When one of the display instruction buttons 42a to 42c is selected by, for example, tapping thereon, processing for displaying a wear gift corresponding to the selected display instruction button is performed. As described above, the display instruction buttons 42a to 42c are display instruction objects for instructing to display a corresponding wear gift in the video being live-distributed. Therefore, in this specification, the display instruction buttons 42a to 42c may be also referred to as display instruction objects 42a to 42c. In the case where it is not necessary to distinguish the display instruction objects 42a to 42c from one another, they may be collectively referred to as the display instruction object 42. A specific example of displaying the wear gift will be described later. The display screen 40 may be displayed on the above-mentioned supporter computer. The display instruction objects 42a to 42c may be selected according to operation of the supporter computer by a supporter.

Each time a display request requesting display of a wear gift is accepted, the display instruction object 42 corresponding to the display request is added to the display screen 40. The number of the display instruction objects 42 that can be displayed on the display screen 40 is limited. In the illustrated embodiment, the maximum number of the display instruction objects 42 that are allowed to be displayed on the display screen 40 is three. In this case, the display screen 40 has a display area in which up to three display instruction objects can be displayed. When four or more display requests to display the wear gift are received, the display instruction object 42 corresponding to the fourth and subsequent display requests are not displayed on the display screen 40. The display instruction object 42 corresponding to the fourth display request of the wear gift is displayed when any of the previous three display instruction objects 42 that have been already displayed is selected and thereby a space for displaying the object corresponding to the forth display request is created.

The gift request processing unit 21f receives a display request to display a gift object from a viewing user, and performs processing to display the gift for which the display request is made. Each viewing user is able to transmit a display request to display a gift to the server device 60 by operating his/her viewing user device. The display request to display a gift may include a user ID of a viewing user and gift identification information (gift ID) that identifies the gift for which the display request is made, and/or, gift object identification information (gift object ID) that identifies the gift object for which the display request is made.

As described above, the gift object may include the effect object corresponding to the effect gift, the normal object corresponding to the normal gift, and the wear object corresponding to the wear gift. The wear gift is an example of a first gift. The wear object may be also referred to as a first gift object The display request for requesting the display of the attached gift (or attached object) is an example of the first display request. The effect object and the normal object are examples of a second object. The effect object and normal object may be also collectively referred to as a second gift object. A display request to request the effect gift (or effect object) or the normal gift (normal object) is an example of a second display request.

Figure 4:
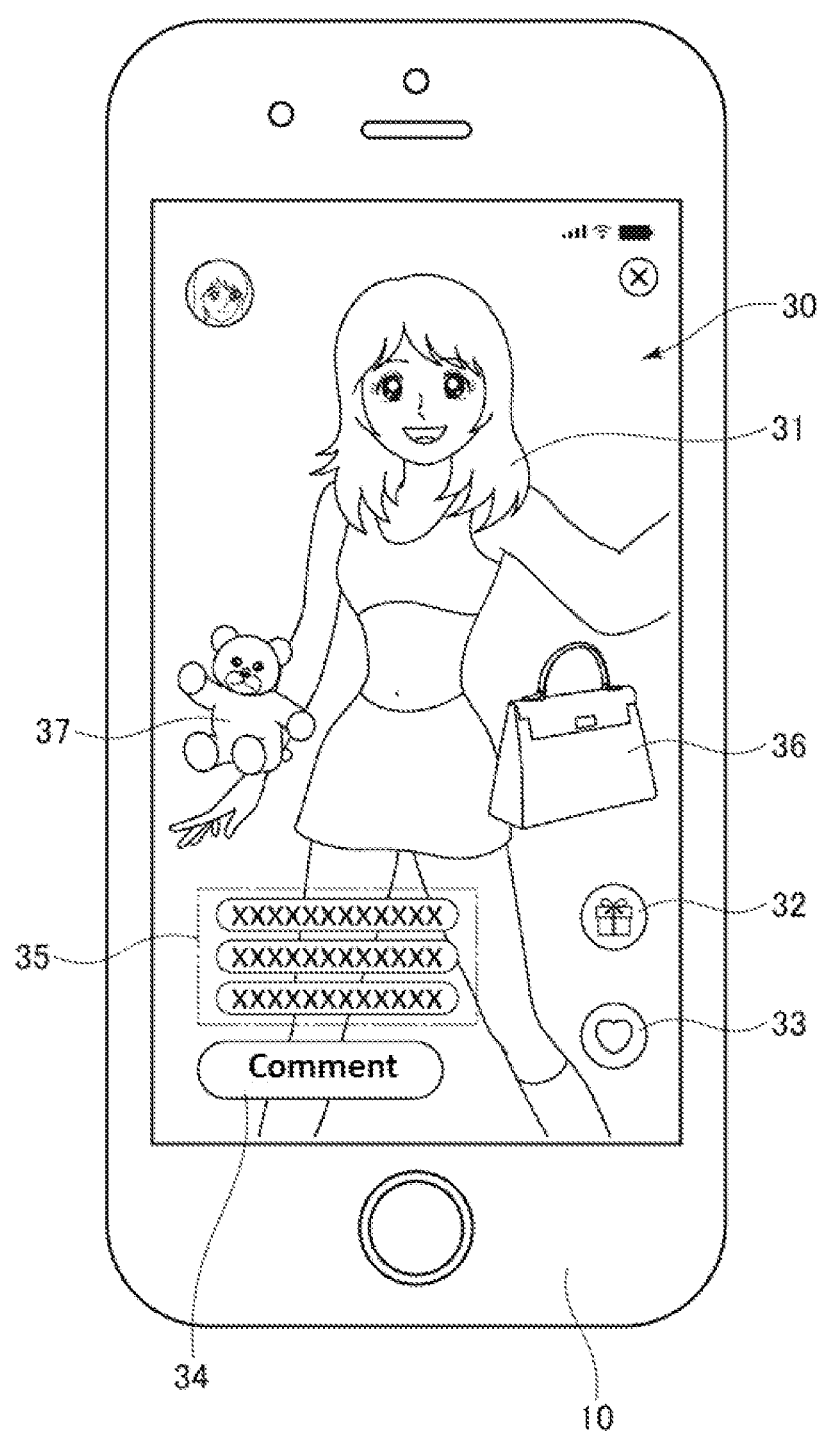
FIG. 4 illustrates an example of a display screen displayed on the viewing user device 10 in one embodiment. On the display screen of FIG. 4, an example of an normal object is shown.

In one embodiment, when the gift request processing unit 61d received a display request to display a specific normal gift from a viewing user, the gift request processing unit 61d performs a process, in response to the display request, to display, in the video, a normal object representing the normal gift for which the display request is made. For example, when a display request to display a normal object representing a bag is made, the gift request processing unit 61d displays a normal object 36 simulating the bag in the display image 30 based on the display request as shown in FIG. 4. Similarly, when a display request to display a normal object representing a stuffed bear is made, the gift request processing unit 61d displays a normal object 37 simulating a stuffed bear in the display image 30 based on the display request as shown in FIG. 4. Although illustration is omitted, the normal object 36 and the normal object 37 are shown in the display image 40 on the distributor user device 20 in the same manner as the display image 30.

In one embodiment, when the gift request processing unit 61d received a display request to display a specific effect gift from a viewing user, the gift request processing unit 61d performs a process, in response to the display request, to display, in the display image of the video, an effect object corresponding to the effect gift for which the display request is made. For example, when a display request to display an effect gift simulating confetti, fireworks or the like is made, the gift request processing unit 61d displays, in the display image 30 and the display image 40, an effect object (not shown) simulating the confetti, fireworks or the like based on the display request.

A display request for a normal gift may include a display position specifying parameter for specifying the display position of a normal object simulating the normal gift. In this case, the gift request processing unit 61d may display the normal object at the position specified by the display position specifying parameter. When a display position and a display range of the character object 31 are defined, the display position designation parameter may designate a position relative to the character object 31 as the display position of the normal object.

Figure 5A:
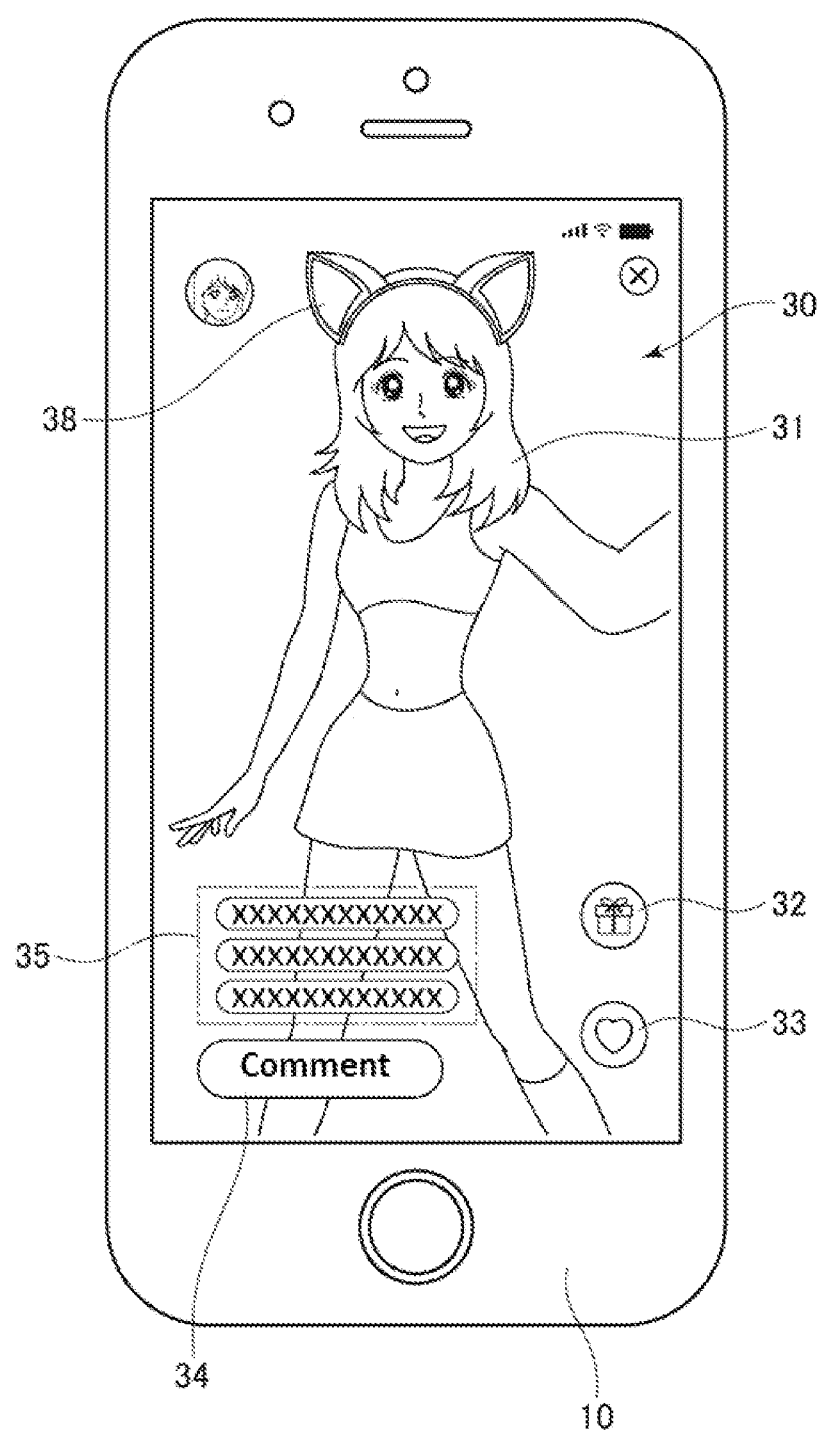
FIG. 5a illustrates an example of a display screen displayed on the viewing user device 10 in one embodiment. On the display screen of FIG. 5a, an example of a wear object is shown.
Figure 5B:
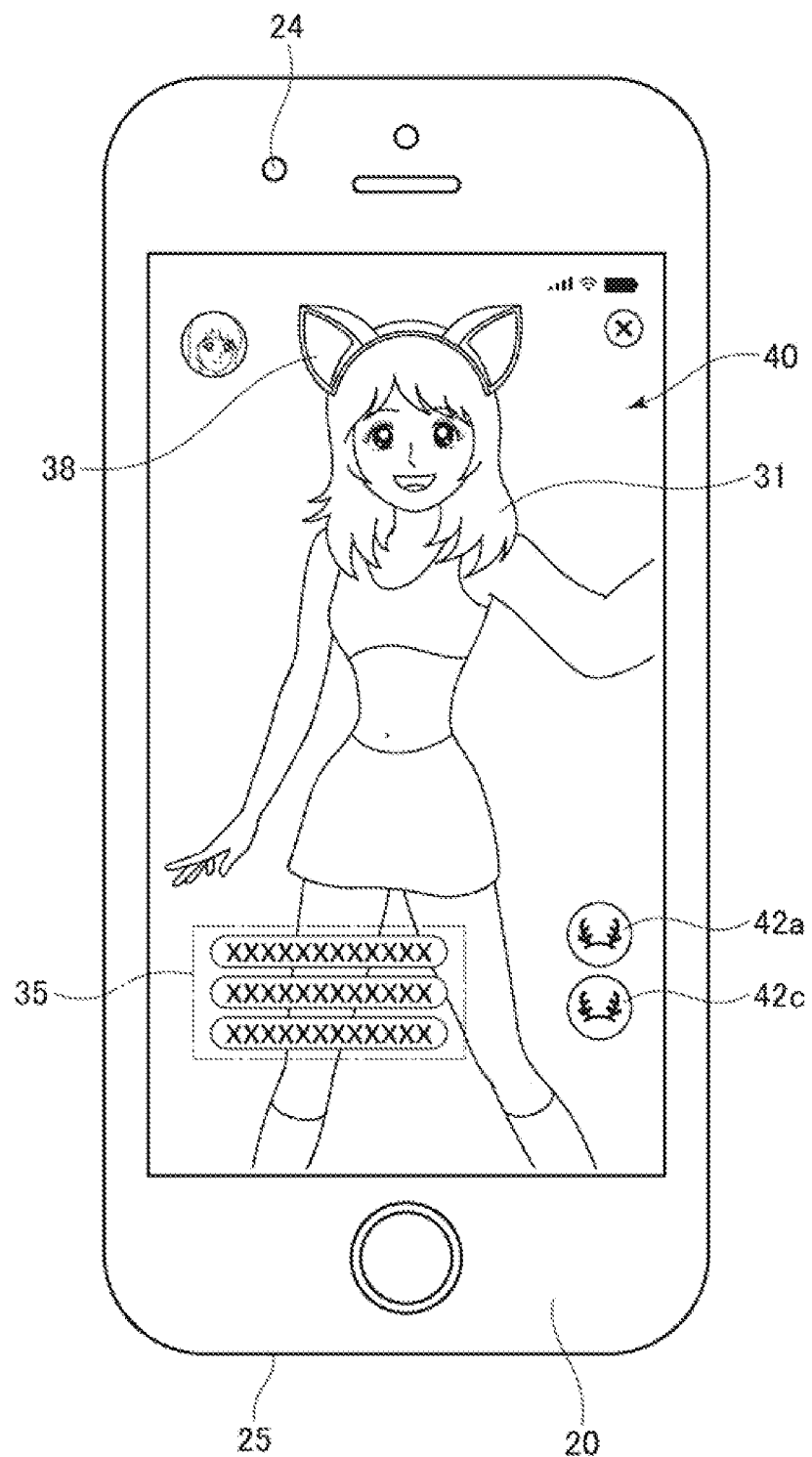
FIG. 5b illustrates an example of a display screen displayed on the distributor user device 20 in one embodiment. On the display screen of FIG. 5b, an example of the wear object is shown.

In one embodiment, when the gift request processing unit 61d received a display request to display a specific wear object from a viewing user, the gift request processing unit 61d displays the display instruction objects 42a to 42c on the display screen 40 of the distributor user device 20 as shown in FIG. 3b. Each of the display instruction objects 42a to 42c is associated with a corresponding wear gift for which the display request has been made. When one of the display instruction objects 42a to 42c is selected, the wear gift associated with the selected display instruction object is displayed in the video that is being live distributed. For example, when the display instruction object 42b is associated with a headband simulating cat's ears and the display instruction object 42b is selected, the gift request processing unit 61d displays, in the video being live distributed, the wear object 38 representing the headband and corresponding to the selected display instruction object 42b. An example of screens of the video including the wear object 38 representing the headband is shown in FIGS. 5a and 5b. Also, as shown in FIG. 5 b, the selected display instruction object 42 b is removed from the display screen 40.

The wear object is displayed in the video in association with a specific body part (worn-on portion) of a character object. For example, the wear object may be displayed such that it contacts with the worn-on body portion of the character object. The wear object 38 may be displayed in the video such that it is worn by the character object at the worn-on body portion. In one embodiment, the wear object 38 representing the headband is association with the head of the character object. Thus, in the screen examples of FIGS. 5a and 5b, the wear object 38 is worn on the head of the character object 31. The wear object may be displayed on the video screen such that it moves along with the motion of the body part of the character object where the object is worn. For example, when the head of the character object 31 with the wear object 38 representing the headband moves, the wear object 38 representing the headband also moves in accordance with the motion of the head of the character object 31 as if the headband is attached to the head of the character object 31.

As described above, the object data 63b may include worn-on portion information indicating which portion of the character object the wear object is associated with. In one embodiment, when the wear object is worn by the character object, the gift request processing unit 61d prevent any other wear object(s) that is worn on the same or overlapping body part as the body part designated by the worn-on portion information of the wear object from being displayed until a display time of the wear object elapses. For example, in a case of a headband associated with "the rear left side of the head" and "the rear right side of the head" and a hair accessory associated with "the rear left side of the head," display of the hair accessory whose worn-on portion information indicates "the rear left side of the head" is prevented while the headband is displayed since their worn-on portions overlap in the "the rear left side of the head." On the other hand, in a case of the headband associated with "the rear left side of the head" and "the rear right side of the head" and an earring associated with "the left ear (of the head)" and "the right ear (of the head)," they can be worn at the same time since their worn-on portions of the character object do not overlap with each other.

In one embodiment, in order to prevent two or more wear objects having the same or overlapping worn-on portion from being displayed, the display instruction object 42 for displaying the wear object whose display is to be prevented may be deactivated. In the embodiment shown in FIG. 5b, it is assumed that the display instruction object 42a is a hair accessory whose worn-on portion information designates the "the rear left side of the head." In this case, since the character object 31 wears the wear object 38 representing the headband, the wear object representing the hair accessory is prohibited from being displayed in the video while the wear object 38 is worn by the character object 31. In one embodiment, in order to prevent the wear object representing the hair accessory from being displayed, the display instruction object 42a associated with the wear object representing the hair accessory may be deactivated. For example, the display instruction object 42a is made unselected even if a user tries to operate it while the wear object 38 is worn by the character object 31. In another embodiment, the display instruction object 42a is removed from the display screen 40 while the wear object 38 is worn by the character object 31. The deactivated display instruction object 42a is reactivated when the display time of the headband has elapsed. In order to reactivate the display instruction object 42a, for example, the display instruction object 42a that has been disabled may be made selectable again, or the display instruction object 42a that has been hidden may be displayed again on the display screen 40.

Figure 6:
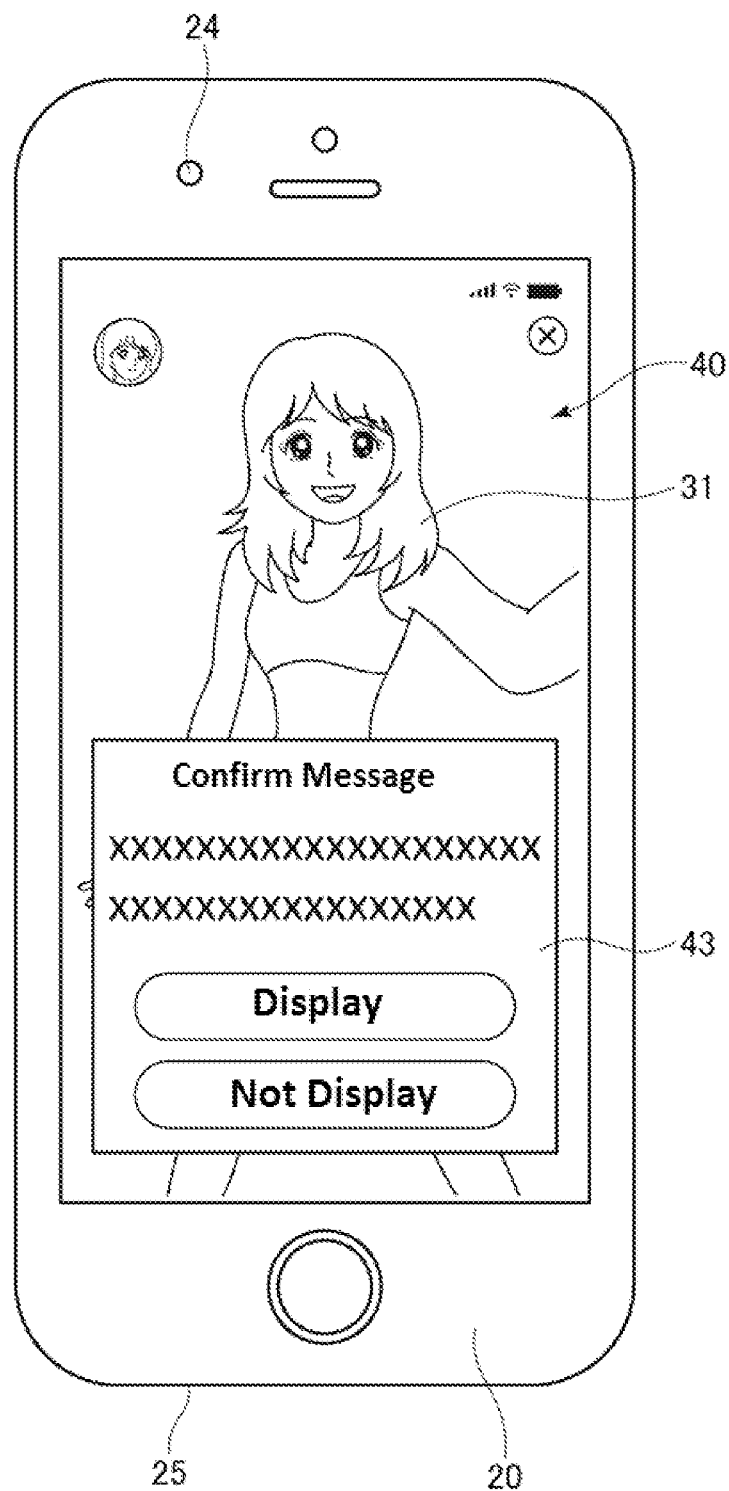
FIG. 6 illustrates an example of a display screen displayed on the distributor user device 20 in one embodiment. On the display screen of FIG. 6, an example of a message confirmation window is shown.

In one embodiment, a viewing user who is viewing a video is able to transmit to the server device 60 a display request requesting that a message gift including a specific message be displayed in the video. When the gift request processing unit 61d received the display request to display the message gift associated with the specific message from the viewing user, the gift request processing unit 61d displays a message confirmation screen 43 on the display screen 40 of the distributor user device 20 as shown in FIG. 6. The message confirmation screen 43 includes a message inputted by the viewing user who made the display request, a button for permitting display of the message in the video, and a button for refusing the display of the message in the video. On the message confirmation screen 43, the distributor user U1 reads the message from the viewing user. When the distributor user permits display of the message gift including the message in the video, the distributor user selects the button described as "display" to perform a display instruction operation for displaying the message gift. Whereas when the distributor user refuses the message gift from being displayed in the video, the distributor user U1 selects the button described as "do not display" to perform a display refusal operation.

Figure 7A:
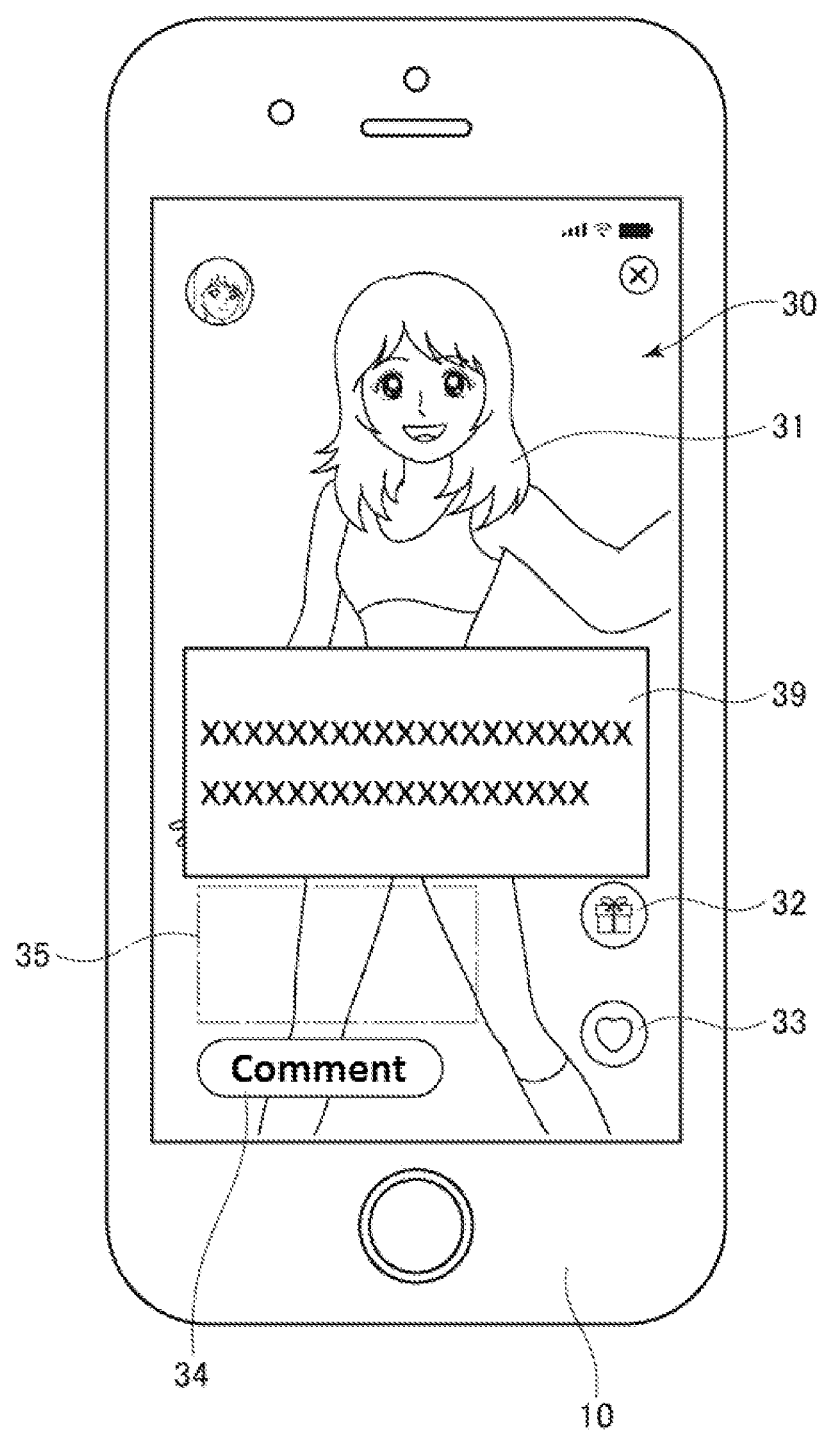
FIG. 7a illustrates an example of a display screen displayed on the viewing user device 10 in one embodiment. On the display screen of FIG. 7a, an example of a message window is shown.
Figure 7B:
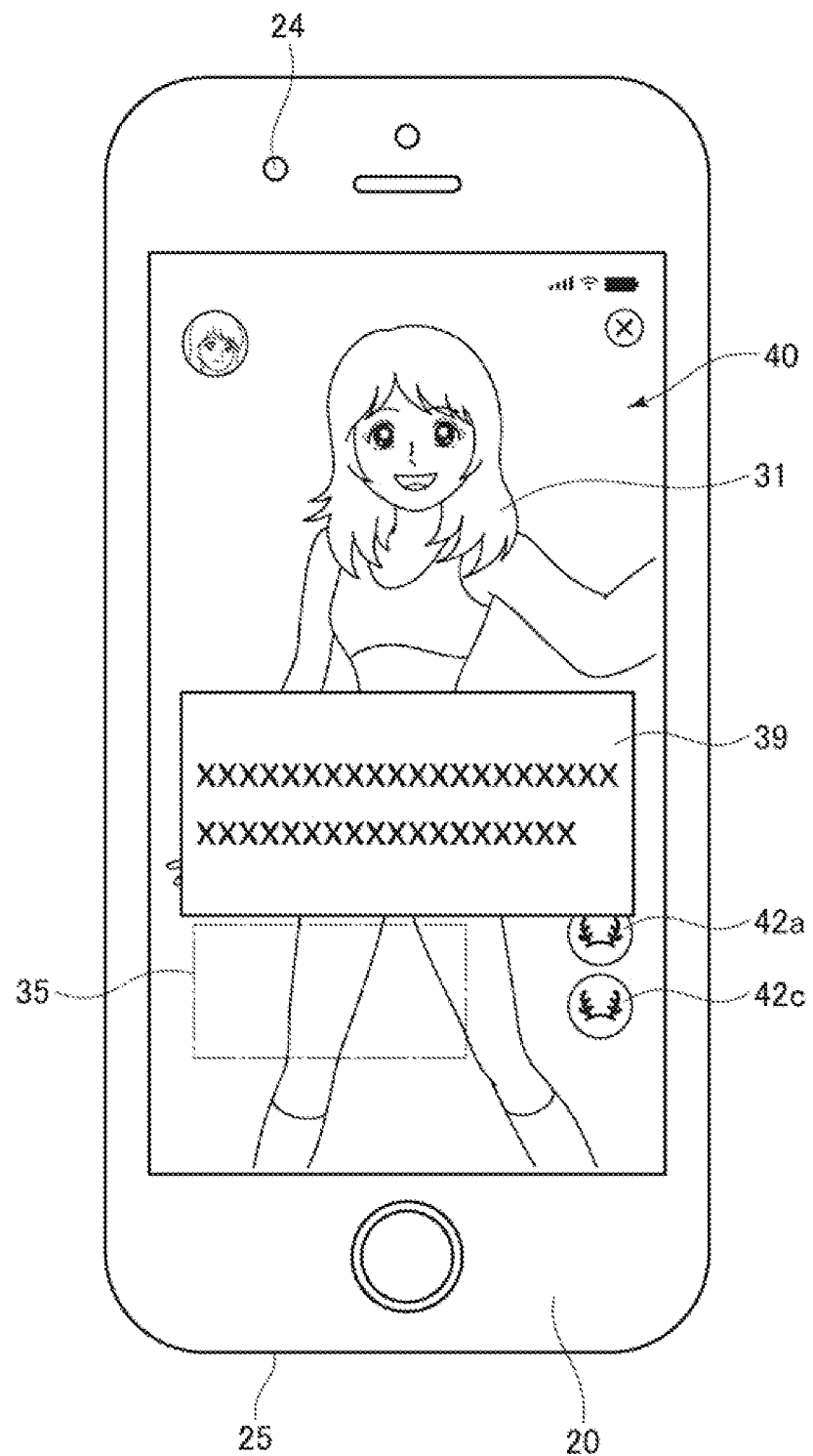
FIG. 7b illustrates an example of a display screen displayed on the distributor user device 20 in one embodiment. On the display screen of FIG. 7b, an example of the message window is shown.

When the display of the message gift is permitted by the distributor user U1, a message object 39 representing the message gift is displayed on the display screen 30 of the viewing user device 10 and the display screen of the distributor user device 20 as shown in FIGS. 7a and 7b. The message object 39 includes text data indicating a message associated with the message gift. The message object 39 may include information about the viewing user (for example, a user name, a nickname or the like of the viewing user) who has made the display request for the message gift.

In one embodiment, a viewing user who is watching a video is able to transmit, to the server device 60, a voice change gift for changing the voice of the distributor user U1 used in the video being live distributed. When the voice change gift is received, the gift request processing unit 61d displays a confirmation screen (not shown) in the display screen 40 of the distributor user device 20. The confirmation screen for confirming whether to change the voice may include information for specifying how the voice is to be changed. For example, the confirmation screen may include information for specifying how the voice is to be changed, such as changing a male voice to a female voice, changing a human voice to an electronic sound like a robot, etc. Further, the confirmation screen also include a button for permitting the voice change requested by the voice change gift, and a button for rejecting the voice change. The distributor user U1 confirms the change content of the voice on the confirmation screen, and performs an instruction operation to permit or reject the change.

In one embodiment, a viewing user who is viewing a video is able to transmit, to the server device 60, a motion gift specifying a movement of body part(s) other than the head of the character object 31 in the live-distributed video. When the gift request processing unit 61d received the motion gift, the gift request processing unit 61d controls the movement of the character object 31 such that the character object 31 takes a motion designated by the motion gift. Subsequently a confirmation screen (not shown) for confirming whether the motion specified by the motion gift is reflected to the movement of the character object 31 is displayed on the display screen 40 of the distributor user device 20. Only when an instruction operation for permitting the reflection of the designated motion is performed by the distributor user U1, the motion designated by the motion gift may be actually reflected on the character object 31.

In one embodiment, in response to a request from a viewing user of the video, the gift purchase processing unit 61e transmits, to the viewing user device of the viewing user (for example, the viewing user device 10), purchase information about a plurality of gift objects that can be purchased in relation to the video. The purchase information of each gift object may include the type of the gift object (the effect object, the normal object, or the wear object), the image of the gift object, the price of the gift object, and any other information necessary to purchase the gift object. The viewing user is able to select a gift object to purchase considering the purchase information of the gift object displayed on the viewing user device 10. The selection of the gift objects to purchase may be performed by operating the viewing user device 10. When a gift object to be purchased is selected by the viewing user, a purchase request for the gift object is transmitted to the server device 60. The gift purchase processing unit 61e performs a payment process based on the purchase request. When the payment process is completed, the purchased gift object is held by the viewing user. The storage 23 may store a gift ID of the purchased gift (or a gift object ID of the gift object representing the gift) in association with the user ID of the viewing user who has purchased the gift.

Gift objects that can be purchased may be different for each video. The gift objects may be made purchasable in two or more different videos. That is, the purchasable gift objects may include a gift object unique to each video and a common gift object that can be purchased in multiple videos. For example, the effect object that simulates confetti may be the common gift object that can be purchased in the two or more different videos.

In one embodiment, when a user purchases an effect object while viewing a video, the purchased effect object may be displayed automatically in the video that the user is viewing in response to completion of the payment process to purchase the effect object. In the same manner, when a user purchases a normal object while viewing a video, the purchased normal object may be automatically displayed in the video that the user is viewing in response to completion of the payment process to purchase the normal object.

In another embodiment, in response to completion of the payment process performed by the gift purchase processing unit 61e for the effect object to be purchased, a notification of the completion of the payment process may be sent to the viewing user device 10, and a confirmation screen may be displayed to allow the viewing user to confirm whether he/she wants to make a display request to display the purchased effect object on the viewing user device 10. When the viewing user selects to make the display request for the purchased effect object, the display request to display the purchased effect object may be sent from the client device of the viewing user to the gift request processing unit 61d, and the gift request processing unit 61d may perform the process to display the purchased effect object in the video 70. Even when the normal object is to be purchased, a confirmation screen may be displayed on the viewing user device 10 to confirm whether the viewing user wants to make a display request to display the purchased normal object, in the same manner as above.

Figure 8:
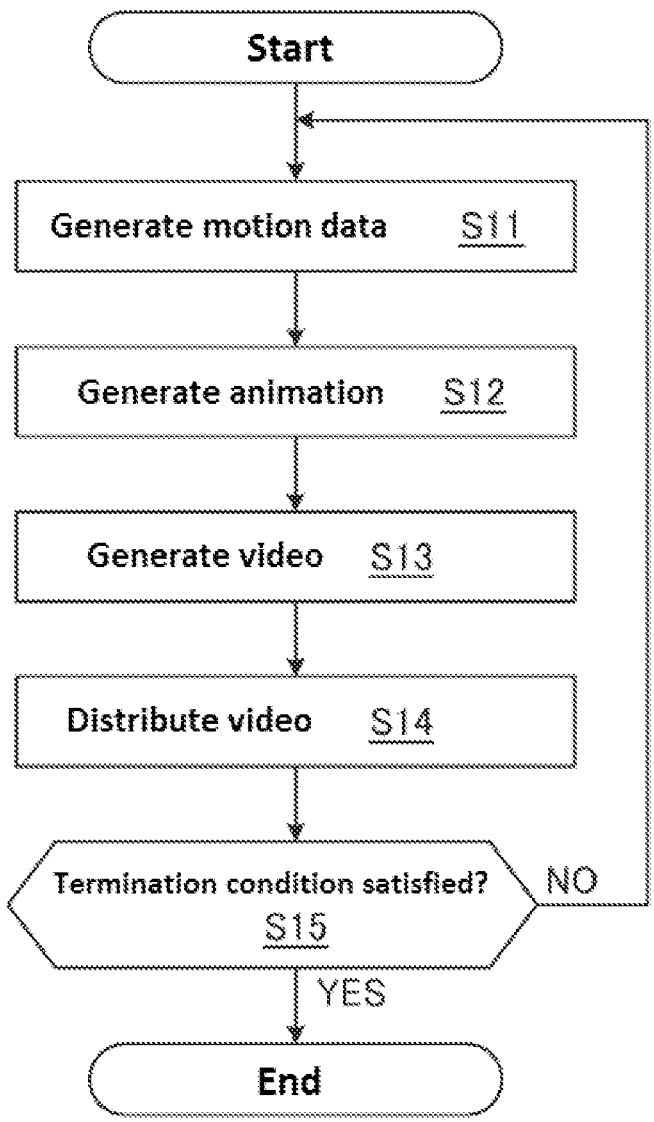
FIG. 8 is a flowchart showing a flow of a video distribution process in one embodiment.
Figure 9:
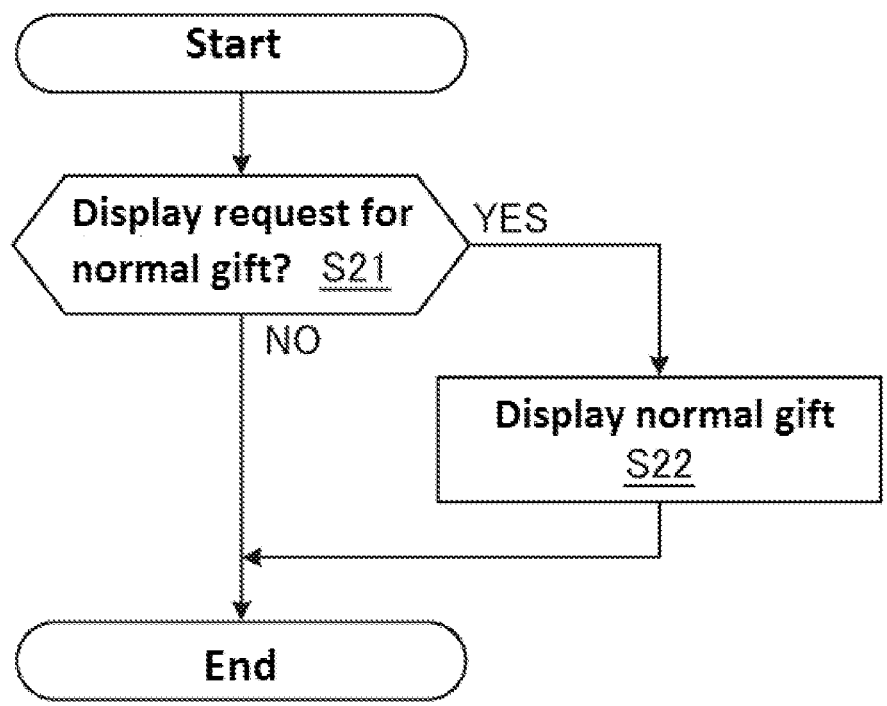
FIG. 9 is a flowchart of a process for displaying a normal gift in one embodiment.
Figure 10:
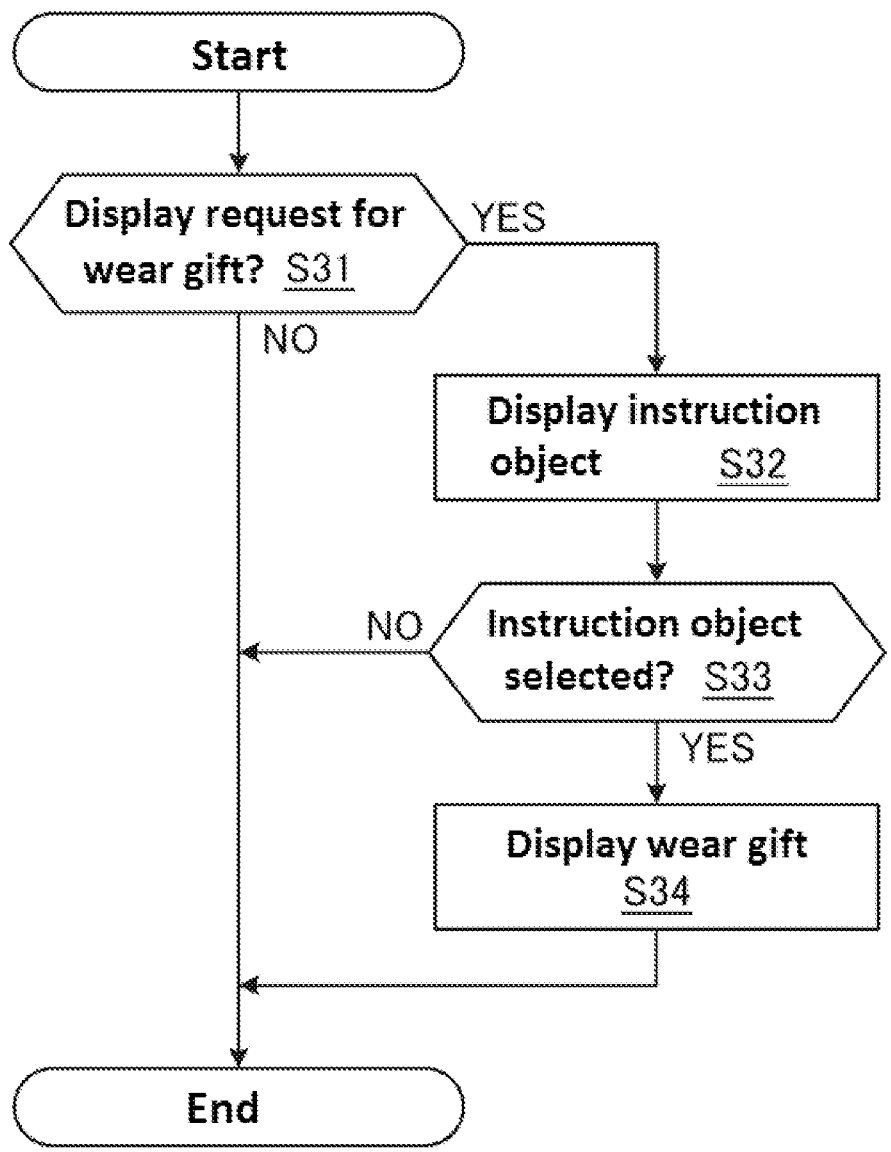
FIG. 10 is a flowchart of a process for displaying a wear gift in one embodiment.
Figure 11:
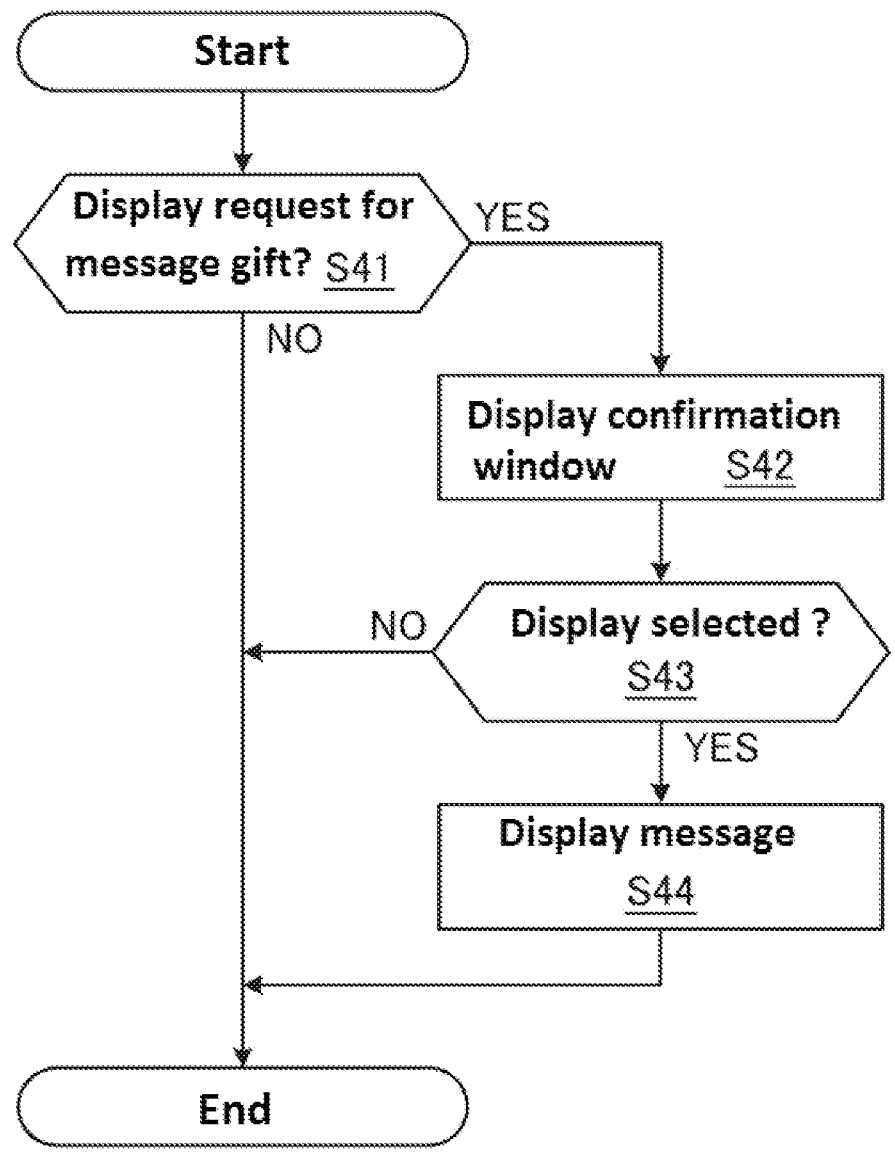
FIG. 11 is a flowchart of a process for displaying a message gift in one embodiment.

Next, with reference to FIGS. 8 to 11, a video distribution process in one embodiment will be described. FIG. 8 is a flowchart showing a flow of a video distribution process in one embodiment, FIG. 9 is a flowchart of a process for displaying the normal object in one embodiment, FIG. 10 is a flowchart of a process for displaying the wear gift in one embodiment, and FIG. 11 is a flowchart of a process for displaying the message object in one embodiment. In the video distribution process described with reference to FIGS. 8 to 11, it is assumed that the video distribution is performed based on the face motion data acquired through the distributor user device 20 by the distributor user U1.

In step S11, face motion data, which is a digital representation of the movement (expression) of the face of the distributor user U1, is generated. The generation of the face motion data is performed, for example, by the face motion data generation unit 21a in the distributor user device 20. In the distributor user device 20, voice data may be generated based on the voice input by the distributor user U1. The generated face motion data and voice data are transmitted to the server device 60.

In step S12, the face motion data from the distributor user device 20 is applied to a model data for the distributor user U1 to generate animation of a character object that moves in synchronization with the facial movement (expression) of the distributor user U1. The generation of the animation is performed, for example, by the above-described animation generation unit 61a.

In step S13, a video including the animation of the character object corresponding to the distributor user U1 is generated. The voice of the distributor user U1 may be included in the video. The animation of the character object is displayed superimposed on the background image. Generation of the video is performed, for example, by the above-described video generation unit 61b.

Next, the process proceeds to step S14 where the video generated in step S13 is distributed. The video is distributed to the viewing user device 10 and other viewing user devices and the distributor user device over the network 50. The video is distributed continuously over a predetermined distribution period. The distribution period of the video may be set to, for example, 30 seconds, 1 minute, 5 minutes, 10 minutes, 30 minutes, 60 minutes, 120 minutes, and any other length of time.

Subsequently in step S15, it is determined whether a termination condition for ending the distribution of the video is satisfied. The termination condition is, for example, that the distribution ending time has come, that the distributor user U1 performed an distribution ending operation on the distributor user device 20 to end the distribution, or any other conditions. If the termination condition is not satisfied, the steps S11 to S14 of the process are repeatedly executed, and distribution of the video including the animation synchronized with the movements of the distributor user U1 is continued. When it is determined that the termination condition is satisfied for the video, the distribution process of the video is ended.

Next, with further reference to FIG. 9, a description is given of the display process of the normal gift object that is performed while a video is live-distributed. The display process of the normal gift object is performed in parallel with the distribution process of the video shown in FIG. 8.

In step S21, it is determined whether a display request for the normal gift object has been made while the video is live-distributed. For example, a viewing user may select one or more specific normal gift objects from among the normal objects that the viewing user possesses and send a display request to display the selected normal gift object(s) from the viewing user device 10 to the server device 60. As described above, a display request for a specific normal gift object may be generated in response to completion of the purchase process or the payment process of the normal gift object.

When the display request for the normal gift object has been made, the display process proceeds to step S22. Step S22 is a process for displaying in the video being distributed the normal gift object for which the display request has been made, based on the display request. For example, when the display request for the normal gift object has been made while a predetermined video is live-distributed, the normal object 36 corresponding to the normal gift for which the display request has been made is displayed on the display screen 30 of the viewing user device 10 as shown in FIG. 4. Although illustration is omitted, the normal object 36 may be also displayed in the display image 40 on the distributor user device 20.

When no display request is made for the normal gift object, the display request for the normal gift object is ended. The display process of the normal gift object shown in FIG. 9 is performed repeatedly in the distribution period of the video. The display process of the effect object is performed by the same procedure as described above for the normal gift object.

Next, with further reference to FIG. 10, a description is given of a display process of the wear gift object that is performed while a video is live-distributed. The display process of the wear gift object is performed in parallel with the distribution process of the video shown in FIG. 8. It is also possible that the display process of the wear object is performed in parallel with the display process of the normal gift object shown in FIG. 9.

In step S31, it is determined whether a display request for the wear gift object has been made while the video is live-distributed. For example, a first viewing user may transmit a display request to display the wear gift that the viewing user possesses from the viewing user device 10 to the server device 60.

When the display request for the wear gift has been made, the display process proceeds to step S32. In step S32, the display instruction object associated with the wear gift for which the display request has been made is displayed on the display screen 40 of the distributor user device 20 based on the display request. For example, when a display request for the wear gift representing a headband is made, the display instruction object 42b associated with the wear gift is displayed on the display screen 40 of the distributor user device 20.

Next, in step S33, it is determined whether a specific display instruction object has been selected from among the display instruction objects included in the display screen 40 of the distributor user device 20.

When the specific display instruction object has been selected, in step S34, the process for displaying the wear gift corresponding to the selected specific display instruction object in the display screen of the live-distributed video. For example, when the display instruction object 42b included in the display screen 40 is selected, the wear object 38 associated with the selected display instruction object 42b is displayed in the display image 30 and the display image 40 as shown in FIGS. 5a and 5b. Subsequently the selected display instruction object 42b is removed from the display screen 40.

When any display instruction object is not selected in step S33 or the display process of the wear gift is completed in step S34, the display process of the wear gift is ended.

Next, with further reference to FIG. 11, a description is given of a display process of the message gift that is performed while a video is live-distributed. The display process of the message gift is performed in parallel with the video distribution process shown in FIG. 8. It is also possible that the display process of the message object is performed in parallel with the display process of the normal gift shown in FIG. 9.

In step S41, it is determined whether a display request for the message gift has been made while the video is live-distributed. For example, a first viewing user is able to transmit a display request to display the message gift that includes a message of text which the first viewing user types, from the viewing user device 10 to the server device 60.

When the display request for the message gift has been made, the display process proceeds to step S42. In step S42, the message confirmation screen 43 associated with the message gift for which the display request has been made is displayed on the display screen 40 of the distributor user device 20 based on the display request.

Next, in step S43, it is determined whether the display of the message gift in the video is permitted. For example, it is determined whether a button associated with permission to display the message gift in the video has been selected or not. The button is shown on the message confirmation screen 43 included in the display screen 40 of the distributor user device 20.

If the button associated with permission to display the message gift in the video is selected, the process for displaying the message gift on the display screen of the live-distributed video is performed in step S44. For example, when the button associated with permission to display the message gift on the message confirmation screen 43 is selected, the message gift 39 for which the display request has been made is displayed in the display image 30 and the display image 40 as shown in FIGS. 7a and 7b.

In step S43, when the button associated with refusal of display of the message gift is selected on the message confirmation screen 43, and when the display process of the message gift is completed in step S44 (for example, In the case where the display time set in the message gift has elapsed), the display process of the message gift is ended.

Figure 12:
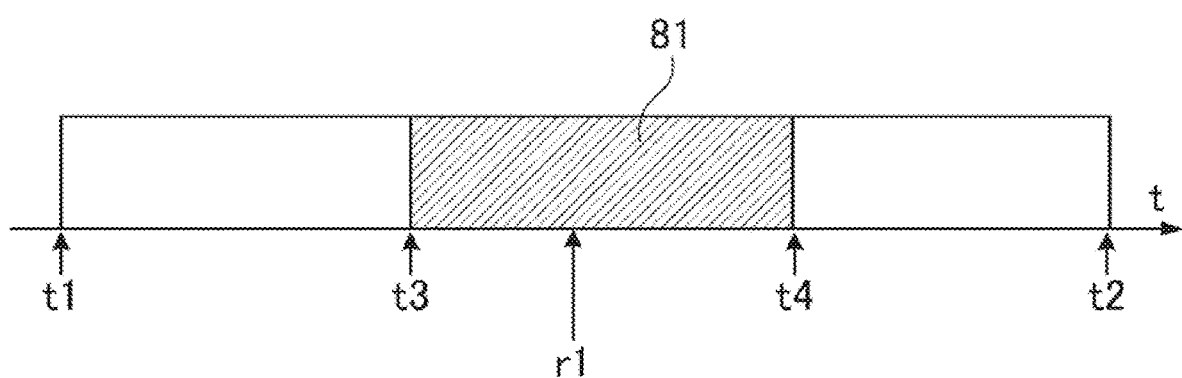
FIG. 12 is a diagram for describing a gift display prohibition period set for a video distributed in the video distribution system of FIG. 1.

In one embodiment, there may be provided an object display prohibition period during which display of a gift object in a live-distributed video is prohibited. FIG. 12 is a schematic diagram for describing the object display prohibition period. FIG. 12 shows that a video is distributed between the time t1 and the time t2. In other words, the time t1 is the start time of the video distribution, and the time t2 is the end time of the video distribution. In the time period for the video distribution, the time period between the time t3 and the time t4 is a gift display prohibition period 81. When a display request r1 for a gift is made in the gift display prohibition period 81, the gift object is not displayed in the display image of the video during the gift display prohibition period 81. More specifically, when a display request for an effect object or a normal object among the gifts is made in the gift display prohibition period 81, the effect object or the normal object for which the display request has been made is not displayed in the live-distributed video during the gift display prohibition period 81, and the gift is displayed in the video at a time after the elapse of the gift display prohibition period 81 (that is, after the time t4). When a display request for a wear gift is made in the gift display prohibition period 81, the display instruction button for instructing the display of the wear gift for which the display request has been made is not displayed on the display screen 40 of the distributor user device 20. The display instruction button is displayed on display screen 40 a time after the elapse of the gift display prohibition period 81. When a display request for a message gift is made in the gift display prohibition period 81, the message confirmation screen 43 for confirming whether display of the message gift for which the display request has been made is permitted is not displayed on the display screen 40 of the distributor user device 20. The message confirmation screen is displayed on display screen 40 at a time after the elapse of the gift display prohibition period 81. Therefore, the distributor user U1 is able to live distribute the video without interference of display of the effect gift or the normal gift in the gift display prohibition period 81. In addition, in the gift display prohibition period 81, the distributor user U1 is able to concentrate on performing in the video being live distributed without operations of adding the display instruction buttons for confirmation of wear gifts or determining whether display of gift messages are permitted. Even in the gift display prohibition period 81, when any of the display instruction buttons 42a to 42c is selected by the distributor user U1, the wear gift corresponding to the selected display instruction button may be displayed. Thus, the distributor user U1 is able to distribute a performance with the character object that wears the desired wear gift.

According to the above embodiment, among the gifts displayed in the video, the gift that is displayed in association with the character object is only the wear object. In a video containing an animation of a character object, the animation of the character object is an element that attracts viewing users' attention. In the above embodiment, a display request for a wear gift that is displayed in association with the character object 31 is made, the display instruction button for displaying the wear gift is displayed on the distributor user device 20 of the distributor user U1. Since the wear gift is not displayed in the video until the display instruction button is selected, it is possible to prevent the wear gift from being displayed untidily around or over the character object. Thus, the viewing experience of the viewing users can be prevented from being deteriorated.

In the conventional video distribution systems, any type of gift object was displayed in a video in response to a display request for the gift object. Therefore, if it is allowed to display gifts in a video in an overlapping manner, too many gifts may be displayed in the video, resulting in a deteriorated viewing experience of the users viewing the video. In the above embodiment, the gifts include the category of wear gift that is displayed in association with the character object, thereby making it possible to control the timing to display the wear gifts that are displayed in association with the character object which is the essential element of the video.

The display time of the normal gifts 36 and 37 may be set shorter than that of the wear gift 38, and the normal objects 36 and 37 may be displayed such that they are not in contact with the character object 31 or behind the character object 31 instead of in front of the character object 31. In this case, the visibility of the character object 31 in the live distributed video is less affected by the normal objects 36 and 37. Thus, even when the normal gifts are automatically displayed in the video in response to display requests from the viewing users (without permission from the distributor user U1), it does not immediately leads to deterioration of the viewing experience of the user caused by the deterioration of the visibility of the character object 31.

In the video distribution system 1 in the above embodiment, a user is able to present a character with a wear object. Thus, it is possible to provide the system having higher originality and to provide service having higher originality using such a system, as compared to systems in which presenting a wear object is not allowed. As a result, it is possible to attract may users with the video distribution system 1 and to increase the number of times the users view videos in the video distribution system 1.

In the video distribution system 1 according to the above-described embodiment, the distributor user U1 is able to distribute a video including a character object that moves in accordance with his/her facial expression using the distributor user device 20 provided with a camera such as a smartphone. As described above, in the video distribution system 1, the equipment necessary for distributing a video by the distributor user U1 is simplified, so realized is a platform in which the distributor user U1 can easily participate.

Advantageous effects of the above embodiments will be now described.

In one embodiment of the invention, in response to reception of a first display request for a first gift from a viewing user, the display instruction object 42 is displayed on the distributor user device 20 used by the distributor user U1. The first gift is displayed in the live-distributed video in response to operation on the display instruction object 42. In this embodiment, the timing at which the first gift for which the display request has been made by the viewing user is displayed in the video is determined by the operation on the display instruction object 42 displayed on the distributor user device 20. Thereby, it is possible to prevent the first gift from being displayed in the video at a timing not preferred by the distributor user U1.

The first gift may be a wear gift associated with a body part of the character object on which the wear gift is worn. The wear gift is displayed in the live-distributed video at a position corresponding to the worn-on portion set for the wear gift in response to operation on the display instruction object 42 displayed on the distributor user device 20. An example of the wear gift is a gift representing a headband associated with the head of a character object. The wear gift representing the headband is displayed in the video as if being worn on the head of the character object 31 in response to operation on the display instruction object 42 corresponding to the wear gift. Wear gifts displayed over or around the character object tend to interfere with the performance by the distributor user U1 through the character object 31, and also tend to degrade the viewing experience of viewing users. In this respect, according to the above embodiment, the timing to display a wear gift associated with a worn-on body portion of the character object 31 in a video is determined in accordance with operation on the display instruction object 42 displayed on the distributor user device 20. Therefore, it is possible to prevent display of the wear gift that is likely to deteriorate the performance by the distributor user U1 through the character object 3 land the viewing experience of the viewing user.

A duration of time of displaying (display time) a wear gift in a video may be set depending on its type. The display time may differ depending on the type of wear gift, or a same predetermined display time may be applied to all the wear gifts. In one embodiment, among the wear gifts, when a first wear gift is displayed in the video, display of other wear gifts whose worn-on portions are same as the first wear gift is prohibited until the display time set for the first wear gift elapses. In one specific embodiment, when the first wear gift is displayed in the video, the display instruction objects 42 for displaying the other wear gifts whose worn-on portions are same as the first wear gift 42 are deactivated until the display time set for the first wear gift elapses. According to this embodiment, it is possible to prevent two or more wear gifts from being displayed over the worn-on portion of the character object.

In one embodiment, in response to reception of a message gift associated with a message from a viewing user, the message confirmation screen 43 for confirming the message is displayed on the distributor user device 20. When the distributor user U1 permits to display in the video the message gift including the message, the distributor user U1 performs a display instruction operation on the distributor user device 20 to display the message gift. Messages posted by viewing users through message gifts may include ones that are inappropriate to display in the video. According to the above embodiment, the distributor user U1 is able to determine whether to display the message gift based on the message displayed on the message confirmation screen 43 of the distributor user device 20, This makes it possible to prevent an inappropriate message gift from being displayed in the video.

In one embodiment, the voice of the distributor user U1 is included in the video, and a voice change instruction object is displayed on the distributor user device 20 in response to reception of a voice change gift for changing the voice of the distributor user U1 from a viewing user. The voice of the distributor user is changed to a voice specified by the voice change gift in response to operation on the voice change instruction object. According to this embodiment, it is possible to prevent the voice from being changed to a voice that is undesirable for the distributor user U1.

In one embodiment, when a second display request for a second gift that is displayed in a video without being associated with a specific body part of the character object 31 is received from a viewing user, the second gift is displayed in the video. The second gift includes an effect gift or a normal gift. According to this embodiment, the second gift, which is displayed in the video without being associated with a specific portion of the character object, is displayed in response to the display request from the viewing user (without operation or instruction by the distributor user). Since the second gift is not displayed in association with a specific portion of the character object, there is a low possibility that it will lead to interference with the performance of the distributor user U1 through the character object 31 and deterioration of the viewing experience of the viewing users. For this reason, the second gift can be displayed in the video without requiring an operation by the distributor user U1, and thereby leading to lively interaction with the viewing users.

In one embodiment, the gift display prohibition period 81 is set in the distribution period of the video, and the second gift is displayed in the video at a timing other than the gift display prohibition period 81. According to this embodiment, it is possible to distribute the video that does not include the second gift to viewing users in the gift display prohibition period 81. For example, by setting the time period in which the distributor user U1 shows his/her performance through the character object 31 as the gift display prohibition period 81, it is possible to prevent the attention of the viewing users from being diverted from the character object 31.

The procedures described herein, particularly those described with a flowchart, are susceptible of omission of part of the steps constituting the procedure, adding steps not explicitly included in the steps constituting the procedure, and/or reordering the steps. The procedure subjected to such omission, addition, or reordering is also included in the scope of the present invention unless diverged from the purport of the present invention.

What is claimed is:

1. A system for allowing live-play of a video on a first user terminal used by a first user, the video containing animation of a character object of a second user, the system comprising:
one or more computer processors,
wherein the one or more computer processors execute computer-readable instructions to:
cause a display instruction object to be displayed on a second user device, the second user device being used by the second user and displaying the video, the display instruction object being displayed in a period other than a gift display prohibition period set in the video, the display instruction object being displayed in response to reception of a first display request for a first gift from the first user; and
cause the first gift to be displayed in the video in a period other than the gift display prohibition period, in response to an operation on the display instruction object.

2. The system of claim 1, wherein the first display request is received in the gift display prohibition period.

3. The system of claim 2, wherein when the first display request is received in the gift display prohibition period, the display instruction object is displayed on the second user device after the gift display prohibition period is ended.

4. The system of claim 1, wherein the gift display prohibition period is a period between a first time after a start time of distribution of the video and a second time before an end time of distribution of the video.

5. The system of claim 1,
wherein the first gift is a wear gift associated with a first portion of the character object, and
wherein the wear gift is displayed in the video associated with the first portion of the character object.

6. The system of claim 1,
wherein the first gift is a first wear gift associated with a first portion of the character object,
wherein the wear gift is displayed in the video associated with the first portion of the character object, and
wherein when receiving from the first user or a third user different from the first user a second display request for a second wear gift associated with the first portion of the character object, the one or more processors deactivate the display instruction object for displaying the second wear gift while the first wear gift is displayed in the video.

7. The system of claim 6, wherein the one or more processors activate the display instruction object for displaying the second wear gift that has been deactivated, in response to an end of display of the first wear gift.

8. The system of claim 1, wherein the one or more processors receive from the first user a third display request for a second gift that is to be displayed in the video without being associated with a specific portion of the character object, and the one or more processors cause the second gift to be displayed in the video in a period other than the gift display prohibition period.

9. The system of claim 8,
wherein the third display request is received in the gift display prohibition period, and
wherein the second gift is displayed in the video after the gift display prohibition period is ended.

10. The system of claim 1,
wherein the display instruction object is selected by a touch operation on the second user device, and
wherein the first gift corresponding to the display instruction object selected by the touch operation is displayed in the video.

11. The system of claim 1, wherein if a maximum number of display instruction objects have been displayed in a display region of the second user device when the first display request is received, another display instruction object corresponding to the first display request is displayed in the display region after any one of the maximum number of display instruction objects displayed in the display region is operated.

12. The system of claim 1,
wherein the display instruction object is also displayed on a display of a supporter computer for changing a setting for generating the video, and
wherein when the display instruction object displayed on the supporter computer is selected, the first gift corresponding to the display instruction object is displayed in the video.

13. The system of claim 1,
wherein the animation of a character object is generated based on a motion of the second user, and
wherein the one or more computer processors are configured to, in response to receiving from the first user a motion gift specifying a motion of the character object, cause the character object to perform the motion specified by the motion gift.

14. The system of claim 13,
wherein the one or more computer processors cause the second user device used by the second user to display a confirmation screen for confirming whether the character object is allowed to perform the motion specified by the motion gift, and
wherein, in response to a display instruction operation on the second user device, the one or more computer processors cause the character object to perform the motion specified by the motion gift.

15. A method performed by one or more computer processors executing computer-readable instructions to allow live-play of a video on a first user terminal used by a first user, the video containing animation of a character object generated based on a motion of a second user, the method comprising:

causing a display instruction object to be displayed on a second user device, the second user device being used by the second user and displaying the video, the display instruction object being displayed in a period other than a gift display prohibition period set in the video, the display instruction object being displayed in response to reception of a first display request for a first gift from the first user; and causing the first gift to be displayed in the video in a period other than the gift display prohibition period, in response to an operation on the display instruction object.

16. A non-transitory computer-readable storage medium storing a program for allowing live-play of a video on a first user terminal used by a first user, the video containing animation of a character object generated based on a motion of a second user, the program causing one or more computer processors to:
cause a display instruction object to be displayed on a second user device, the second user device being used by the second user and displaying the video, the display instruction object being displayed in a period other than a gift display prohibition period set in the video, the display instruction object being displayed in response to reception of a first display request for a first gift from the first user; and
cause the first gift to be displayed in the video in a period other than the gift display prohibition period, in response to an operation on the display instruction object.

* * * * *